(12) United States Patent
Maruhashi et al.

(10) Patent No.: US 7,924,799 B2
(45) Date of Patent: Apr. 12, 2011

(54) RADIO COMMUNICATION DEVICE

(75) Inventors: Kenichi Maruhashi, Minato-ku (JP); Hidenori Shimawaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 187 days.

(21) Appl. No.: 10/594,444

(22) PCT Filed: Mar. 9, 2005

(86) PCT No.: PCT/JP2005/004093
§ 371 (c)(1),
(2), (4) Date: Sep. 26, 2006

(87) PCT Pub. No.: WO2005/093982
PCT Pub. Date: Oct. 6, 2005

(65) Prior Publication Data
US 2007/0133493 A1    Jun. 14, 2007

(30) Foreign Application Priority Data

Mar. 26, 2004 (JP) ................................ 2004-093549

(51) Int. Cl.
 H04B 7/216 (2006.01)
 H04B 1/10 (2006.01)
 H04W 4/00 (2009.01)
 H04W 72/00 (2009.01)
(52) U.S. Cl. ........ 370/342; 370/328; 370/335; 370/338; 455/452.1; 455/296
(58) Field of Classification Search .................. 370/342, 370/464, 229–235; 455/452.1, 296
See application file for complete search history.

(56) References Cited

U.S. PATENT DOCUMENTS 5,861,781 A * 1/1999 Ashby ............................ 332/170
6,920,504 B2 * 7/2005 Bender et al. .................. 709/232
(Continued)

FOREIGN PATENT DOCUMENTS
JP        01-220920 A        9/1989
(Continued)

OTHER PUBLICATIONS

Yuanrun Teng et al., "Performance Analysis of SDM-OFDM System with Adaptive Modulation Method over MIMO Channels", the Institute of Electronics; IEICE Technical Report, vol. 103 No. 66, May 23, 2003, pp. 75-82.

(Continued)

Primary Examiner — Kamran Afshar
Assistant Examiner — Kathy Wang-Hurst
(74) Attorney, Agent, or Firm — Sughrue Mion, PLLC

(57) ABSTRACT

A radio communications device includes a transmitter, a receiver, a propagation detecting unit, and a symbol rate setting unit. The receiver has a plurality of antennas, a plurality of transmitting circuits, and a transmission signal processing circuit. The transmission signal processing circuit has a modulator, and modulates data input transmission data in modulator to output the modulated data as transmission signal to the transmitting circuits. The receiver has a plurality of antennas, a plurality of receiving circuits, and a reception signal processing circuit. The reception signal processing circuit has a demodulator, demodulates reception signals input from the receiving circuits in demodulator to generate reception data. The propagation detecting unit detects propagation state of radio waves. The symbol rate setting unit selects a symbol to be communicated from a plurality of symbol rates based on the detected propagating state and sets the selected symbol rate to the modulator and to the demodulator.

16 Claims, 15 Drawing Sheets

U.S. PATENT DOCUMENTS

| | | | |
|---|---|---|---|
| 7,230,991 B2 * | 6/2007 | Sang et al. | 375/260 |
| 7,315,563 B2 * | 1/2008 | Smith et al. | 375/130 |
| 2004/0143428 A1 * | 7/2004 | Rappaport et al. | 703/22 |
| 2004/0165558 A1 * | 8/2004 | Ling et al. | 370/334 |
| 2004/0171385 A1 * | 9/2004 | Haustein et al. | 455/450 |
| 2005/0058114 A1 * | 3/2005 | Santhoff et al. | 370/343 |
| 2005/0075073 A1 * | 4/2005 | Kadous et al. | 455/63.1 |
| 2005/0141472 A1 * | 6/2005 | Shin et al. | 370/342 |
| 2006/0141952 A1 * | 6/2006 | Kung et al. | 455/102 |
| 2006/0146705 A1 * | 7/2006 | Waxman | 370/230 |
| 2006/0193294 A1 * | 8/2006 | Jorswieck et al. | 370/334 |
| 2006/0206552 A1 * | 9/2006 | Borean et al. | 708/400 |

FOREIGN PATENT DOCUMENTS

| | | |
|---|---|---|
| JP | 05-335975 A | 12/1993 |
| JP | 07-030453 A | 1/1995 |
| JP | 07-154376 A | 6/1995 |
| JP | 07-162350 A | 6/1995 |
| JP | 08-084105 A | 3/1996 |
| JP | 08-139632 A | 5/1996 |
| JP | 09-093158 A | 4/1997 |
| JP | 09-219672 A | 8/1997 |
| JP | 2736067 B2 | 1/1998 |
| JP | 10-303849 A | 11/1998 |
| JP | 3014757 B2 | 12/1999 |
| JP | 3059058 B2 | 4/2000 |
| JP | 3073767 B2 | 6/2000 |
| JP | 2001-237853 A | 8/2001 |
| JP | 3407708 | 5/2003 |
| JP | 2003-318999 A | 11/2003 |
| WO | WO 02/093779 A2 | 11/2002 |

OTHER PUBLICATIONS

Sumaru Niida et al., "Adaptive Modulation Using Space-Time Block Code Matrix" KDDI R&D Laboratories Inc., Mar. 6, 2002, pp. 31-35.

Masaki Hayashi et al., "Performance of IMT-200 TDD Mode Test Bet", Wireless Solution Laboratories, the Institute of Electronics; IEICE Technical Report, vol. 101, No. 682, Feb. 27, 2002.

Jun Hizamoto, et al. "MIMO Channel Ni Okeru Tekio Hencho O Mochiita SDM-OFDM System" The Institute of Electronics, Information and Communication Engineers Gijutsu Kenkyu Hokoku, May 16, 2003, vol. 103, No. 66, pp. 75-to 82.

* cited by examiner

RADIO COMMUNICATION DEVICE

This application claims priority from PCT Application No. PCT/JP2005/004093 filed Mar. 9, 2005, and from Japanese Patent Application No. 2004-093549 filed Mar. 26, 2004, which applications are incorporated herein by reference.

TECHNICAL FIELD

The present invention relates to a radio communications system employing a spatial multiplexing process.

BACKGROUND ART

In recent years, efforts have been made to speed up radio communications systems such as microwave cellular phone systems, radio LAN (Local Area Network) systems, etc. by using multilevel modulation/demodulation and multiple carriers. However, there is a limitation imposed on the speeding-up efforts due to a narrow frequency band that can be used. For example, if multilevel PSK (Phase Shift Keying) is employed, then the error rate is degraded and a very high performance level is required for phase noise and frequency stability of the oscillator. If multiple carriers are achieved by OFDM (Orthogonal Frequency Division Multiplexing), then the frequency band is determined by the product of the number of subcarriers and the symbol rate. Therefore, the frequency band needs to be wider as the system Is speeded up. There is known another problem in that since the difference between the peak power and the average power is large, low-distortion transmission amplifiers are generally required.

Consequently, there has been developed a radio communications system which incorporates the MIMO (Multi-Input Multi-Output) technology in the microwave band. FIG. 1 is a block diagram of a radio communications device employing the above technology. Transmitter 500 has transmitting circuits 501-1 through 501-3, antennas 502-1 through 502-3, and transmission signal processing circuit 504. Transmission data is processed by transmission signal processing circuit 504, and radiated as radio waves from antennas 502-1 through 502-3 by transmitting circuits 501-1 through 501-3. Receiver 506 has antennas 508-1 through 508-3, receiving circuits 507-1 through 507-3, and reception signal processing circuit 510. The radio waves received by antennas 508-1 through 508-3 are converted by receiving circuits 507-1 through 507-3 into reception signals, which are processed by reception signal processing circuit 510 into reception data that is output. Reception signal processing circuit 510 also outputs a channel matrix. The MIMO radio communication device is a radio communications device made up of a transmitter with antennas and a receiver with antennas, or a plurality of antennas and a plurality of transceivers, and perform communications according to a spatial multiplexing process.

To the extent of the number of communications paths (independent spatial transmission paths), including multipaths, which can be orthogonalized, the transmission rate is proportional to the number of antennas (either the number of transmission antennas or the number of reception antennas which is smaller). Therefore, the transmission rate can be increased while using the same frequency and the same time. Using time-space coding, a spatial diversity effect is produced to obtain a good SNR (Signal to Noise Ratio).

In general, as the frequency is higher, the radio wave tends to travel straighter, which differentiates a propagative environment. The frequency at which the propagative environment changes is said to be about 10 GHz. Beyond that frequency, it is difficult to perform non-line-of-sight communications. For example, according to "Propagation data and prediction methods for the planning of indoor radio communication systems and radio local area networks in the frequency range 900 MHz to 100 GHz", ITU-R, P. 1238-3, Apr. 2003, power loss coefficients representing the attenuated amount of radio waves over the distance that the radio waves are propagated are in the range from 28 to 32 in the frequency range from 0.9 to 5.2 GHz in offices, and 22 at the frequency of 60 GHz. Since the power loss coefficient is 20 for a free space loss, scattering and diffraction are considered to be less influential at high frequencies such as 60 GHz. Multipaths are considered to be relatively few though the intensity of radio waves is occasionally strong in some multipaths. A radio system employing millimeter waves, e.g., in the 60 GHz band is described in a document by K. Ohata, et. al. (IEEE MTT-S International Microwave Symposium. Digest, Jun. 2003. pp. 373-376). The modulation process that is used is ASK (digital amplitude modulation), and a high rate of 1.25 Gbits/sec. is achieved for radio communications.

DISCLOSURE OF THE INVENTION

Problems to be Solved by the Invention

Radio communications devices incorporating MIMO technology consume a large amount of electric power because a plurality of transmission and reception circuits are operated. The transmission signal processing circuit estimates a channel matrix and converts and distributes transmission signals to a plurality of transmitting circuits, and the reception signal processing circuit has a function to combine and convert reception signals from a plurality of receiving circuits, resulting in consumption of a large amount of electric power. Electric Power consumption is also increased by high-rate D/A converters (DACs), A/D converters (ADCs), and time-space coding circuits.

According to a literature by Karasawa, et. al. (2003, IEICE Society Conference, Lecture Transactions 1, SS-30, Lecture No. TB-2-1), if the antenna interval is a one-half wavelength or longer, then when multipaths arrive in a wide angular range, the elements of the channel response matrix vary non-correlatively. At this time, the transmission capacity increases, but the one-half wavelength becomes about 6 cm at 2.4 GHz, for example. If there is no local scattering in line-of-sight communications, then it is desirable that the antenna interval be increased by a considerable distance.

A literature by D. Gesbert (IEEE Journal on Selected Areas in Communications, Vol. 21, No. 3, Apr. 2003) shows 10 wavelengths as the element-to-element interval of four-element antennas for use on base stations in a cellular phone system in the above environment. The disclosed antenna interval as applied to portable terminals and microwave radio communications device for use in offices and homes is not practical in terms of size. Radio systems employing millimeter waves, e.g., in the 60 GHz band, use ASK (Amplitude Shift Keying), FSK (Frequency Shift Keying), or BPSK (Binary Phase Shift Keying) of a low modulation index, and mostly utilize point-to-point communications with a narrowed antenna beam. If the antenna beam is widened, then the signal quality is lowered or a transmission failure occurs due to multipath interference especially in indoor communications. This is because if the symbol rate is increased, the delay time (the difference between arrival times of direct and reflected waves) is broadened relatively largely as compared with the symbol length, giving rise to an intersymbol interference. In order to lower the symbol rate to avoid an intersymbol interference and maintain high-rate communications, there is employed a radio communication device using multilevel QAM (Quadrature Amplitude Modulation) or QAM as primary modulation and OFDM as secondary modulation. However, such a radio communications device suffers practical problems because the oscillator is required to have low phase noise characteristics and frequency stability, the transmission amplifier is required to be highly linear, and, in particular, radio communications devices for use in the millimeter wave range are complex, highly costly, and large in size.

It is an object of the present invention to provide a radio communications device which is capable of transmitting data at a high-rate while suppressing electric power consumption, hardly experiences communication interruptions due to multipath interference, and is small in size.

Means for solving the problems:

According to a first aspect of the present invention, a radio communication device comprises:

a transmitter comprising:
   a plurality of transmission antennas for radiating radio waves based on transmission RF signals;
   a plurality of transmitting circuit means for supplying the transmission RF signals to said transmission antennas, respectively, based on a plurality of transmission signals; and
   transmission signal processing means having modulating means, for modulating input transmission data to generate said transmission signals by using said modulating means, and for outputting the transmission signals to said transmitting circuit means;

a receiver comprising:
   a plurality of reception antennas for receiving the radio waves from said transmitter and for outputting reception RF signals;
   a plurality of receiving circuit means for outputting reception signals based on said reception RF signals input respectively from said reception antennas; and
   reception signal processing means having demodulating means, for demodulating the reception signals output respectively from said receiving circuit means by using said demodulating means, and for generating reception data;

propagation detecting means for detecting a propagating state of said radio waves; and symbol rate setting means for selecting a symbol rate to be used from a plurality of symbol rates based on the detected propagating state, and for setting the selected symbol rate in said modulating means and said demodulating means.

According to a second aspect of the present invention, a radio communication device comprises:

a transmitter comprising:
   a plurality of transmission antennas for radiating radio waves based on transmission RF signals;
   a plurality of transmitting circuit means for supplying the transmission RF signals to said transmission antennas, respectively, based on a plurality of transmission signals; and
   transmission signal processing means having a plurality of modulating means having respective different symbol rates, for modulating input transmission data to generate said transmission signals by using a selected one of said modulating means, and for outputting the transmission signals to said transmitting circuit means;

a receiver comprising:
   a plurality of reception antennas for receiving the radio waves from said transmitter and for outputting reception RF signals;
   a plurality of receiving circuit means for outputting reception signals based on said reception RF signals input respectively from said reception antennas; and
   reception signal processing means having a plurality of demodulating means having respective different symbol rates, for demodulating the reception signals input respectively from said receiving circuit means by using a selected one of said demodulating means, and for generating reception data;

propagation detecting means-for detecting a propagating state of said radio waves; and modulating means/demodulating means selecting means for selecting one of said modulating means and one of said demodulating means based on the detected propagating state.

Depending on the intensity of a multipath interference, the symbol rate is controlled to achieve high-rate transmission with optimized electric power consumption. Radio communications devices using frequencies of 10 GHz or higher, particularly frequencies of millimeter waves (30 to 300 GHz), even with an array of antennas, may be reduced in size. If multipath interference is weak, the radio communications device is operated in the direct modulation/demodulation mode, thereby achieving high-rate communications with low electric power consumption. If multipath interference is strong, then though the electric power consumption increases, the possibility of communication interruptions due to multipath interference is lowered, and hence communications can be continued while maintaining a certain transmission rate.

BEST MODE FOR CARRYING OUT THE INVENTION

1st EMBODIMENT

Figure 1:
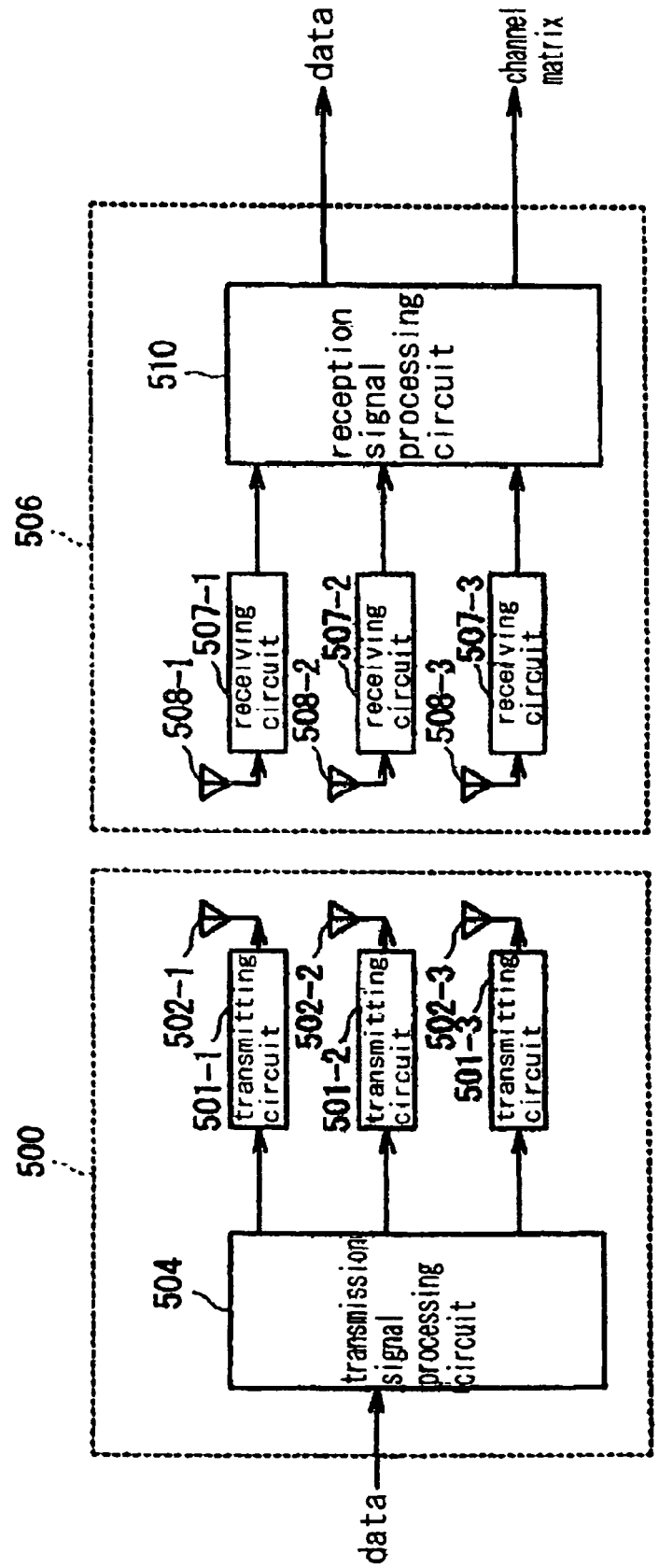
FIG. 1 is a block diagram of a conventional radio communication device.
Figure 2:
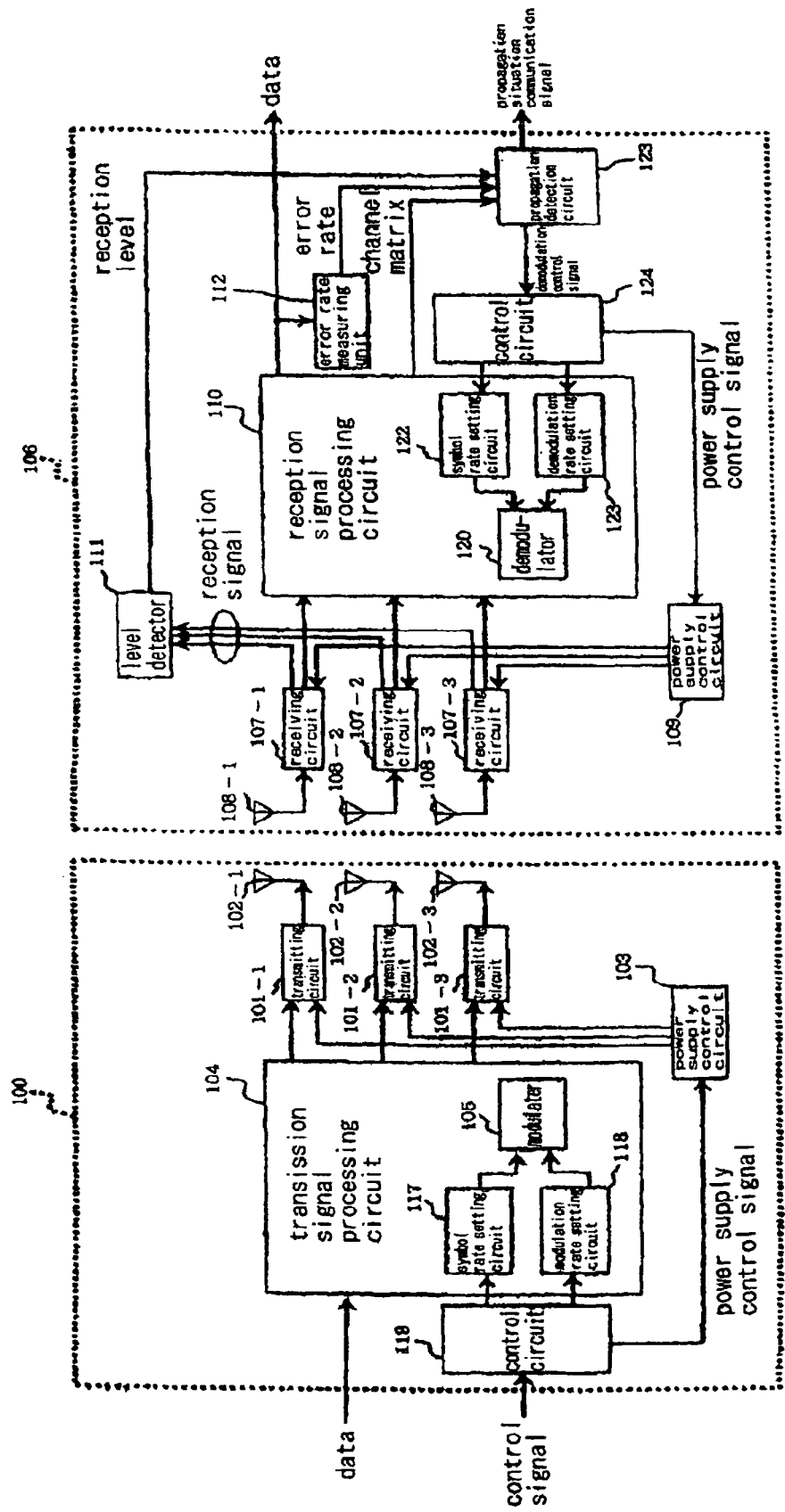
FIG. 2 is a block diagram of a radio communication device according to a first embodiment of the present invention.

Referring now to FIG. 2, a radio communications device according to a first embodiment-of the present invention comprises transmitter 100 and receiver 106. Since communications are normally bidirectional, a plurality of radio communications devices are positioned in facing relation to each other for communications therebetween. In this embodiment, transmitter 100 and receiver 106 are a transmitter and a receiver, respectively, of radio communications devices that face each other.

Transmitter 100 comprises antennas 102-1 through 102-3, transmitting circuits 101-1 through 101-3 connected respectively to antennas 102-1 through 102-3, power supply control circuit 103, transmission signal processing circuit 104, and control circuit 119.

Power supply control circuit 103 controls power supplies whose power is to be supplied to transmitting circuits 101-1 through 101-3 based on a power supply control signal from control circuit 119. Transmission signal processing circuit 104 has, in addition to a modulating function, at least one of a coding function with respect to an MIMO process and a weighting/mapping function. Transmission signal processing circuit 104 includes symbol rate setting unit 117. modulation rate setting unit 118, and modulator 105, and is capable of changing a symbol rate and the multilevel modulation number (or index) according to a control signal from control circuit 119. Transmission signal processing circuit 104 modulates data input to transmitter 100 in modulator 105, and outputs the modulated data as transmission signals to transmitting circuits 101-1 through 101-3.

Receiver 106 comprises antennas 108-1 through 108-3, receiving circuits 107-1 through-3 connected respectively to antennas 108-1 through-1083, power supply control circuit 109, reception signal processing circuit 110, level detector 111, error rate measuring unit 112, propagation detecting circuit 123, and control circuit 124.

Power supply control circuit 109 controls a power supply whose power is to be supplied to receiving circuits 107-1 through 107-3 based on a power supply control signal from control circuit 124. Reception signal processing circuit 110 includes symbol rate setting unit 122, demodulation rate setting unit 123, and demodulator 120, and has, in addition to a demodulating function, at least one decoding function with respect to an MIMO process and a weighting/demapping function. Reception signal processing circuit 110 demodulates reception signals input from receiving circuits 107-1 through 107-3 in demodulator 120, and outputs the demodulated data as reception data. Reception signal processing circuit 110 also estimates a channel matrix based on the reception signals input from receiving circuits 107-1 through 107-3, and outputs the estimated channel matrix. Level detector 111 detects a reception level based on reception level signals input from receiving circuits 107-1 through 107-3, and outputs the detected reception level. Error rate measuring unit 112 measures a bit error rate or a frame error rate based on the reception data output from reception signal processing circuit 110, and outputs the error rate. Propagation detecting circuit 123 is supplied with the reception level, the error rate, and the channel matrix, determines the intensity of multipath interference, and outputs a modulation control signal and a propagating situation communication signal that is equivalent to the modulation control signal. Control circuit 124 outputs the power supply control signal to power supply control circuit 109, and sets a symbol rate and a demodulation mode respectively in symbol rate setting unit 122 and demodulation mode setting unit 123 based on the modulation control signal. The propagating situation communication signal is sent to control circuit 119 of transmitter 106, and control circuit 119 sets a symbol rate and a modulation mode respectively in symbol rate setting unit 117 and modulation rate setting unit 118.

Figure 3:
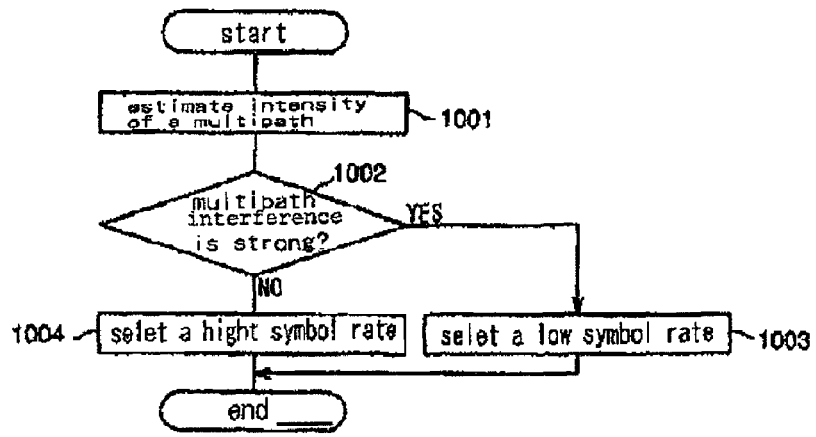
FIG. 3 is a flowchart of a process of determining a symbol rate according to the first embodiment.

In the radio communications device, a symbol rate is determined as shown in FIG. 3. Demodulation mode setting unit 123 estimates the intensity of multipath interference based on the reception level output from level detector 111, the error rate output from error rate measuring unit 112, and the channel matrix output from reception signal processing circuit 110, in step 1001. Demodulation mode setting unit 123 then determines whether or not the multipath interference is strong in step 1002. If it is determined that the multipath interference is strong, then demodulation mode setting unit 123 outputs a modulation control signal and a propagating situation communication signal to set a symbol rate to a low value. In response to the propagating situation communication signal, control circuit 119 controls symbol rate setting unit 117 to lower the symbol rate in modulator 105 in step 1003. Control circuit 124 controls symbol rate setting unit 122 to lower the symbol rate in demodulator 120. If it is determined that the multipath interference is weak in step 1002, then demodulation mode setting unit 123 outputs a modulation control signal and a propagating situation communication signal to set a symbol rate to a high value. Control circuit 119 controls symbol rate setting unit 117 to increase the symbol rate in modulator 105 in step 1004. Control circuit 124 controls symbol rate setting unit 122 to increase the symbol rate in demodulator 120. After the symbol rate is determined, communicatons are performed for normal data transmission.

In the present embodiment, it is an essential feature to determine the extent of multipath interference based on a signal propagating state. Although not shown herein, the station's own signal propagating state or the signal propagating state of another station can be known during a preamble period to synchronize the station with the other station or during a period In which communications are made for data transmission. During the communications, the signal propagating state of the other station can be received as part of the data that are transmitted. The stations' own signal propagating state is sent to the other station.

Figure 4:
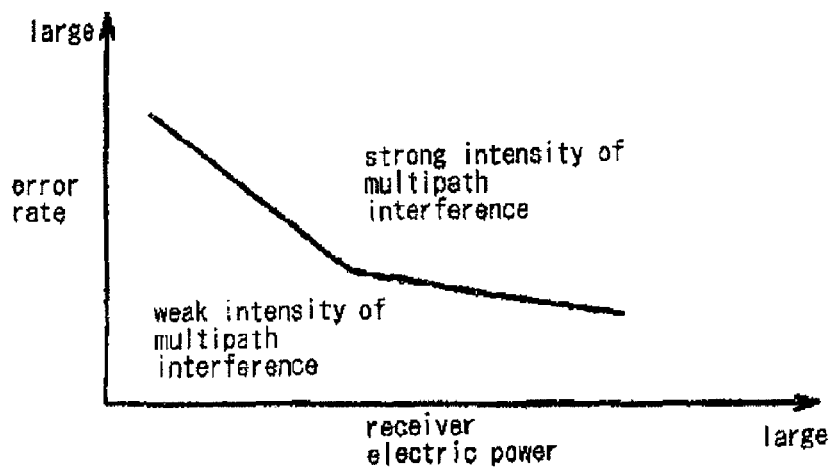
FIG. 4 is a graph showing by way of example the relationship between reception electric power levels and error rates which determines the intensity of multipath interference.
Figure 5:
FIG. 5 is a graph showing the relationship between the number of independent spatial transmission paths and multipath levels according to MIMO.

The signal propagating state is calculated from the reception level output from level detector 111, the error rate output from error rate measuring unit 112, and the channel matrix output from reception signal processing circuit 110. The signal propagating state can be represented by the number of independent spatial transmission paths which can contribute to communications, the rate of retransmission requests due to errors, etc. For example, as shown in FIG. 4, the intensity of multipath interference may be prescribed from the relationship between the received electric power and the error rate, and a multipath interference may be prescribed as being high if the error rate (or the rate of retransmission requests due to errors) is high though the received electric power is high. Furthermore, as shown in FIG. 5, the number of independent spatial transmission paths which can contribute to communications may be determined from an inherent value that is calculated from the estimated channel matrix, and the extent of a multipath interference may be determined therefrom. These processes may be combined with each other, or the extent of a multipath interference may be prescribed stepwise. Naturally, it is also possible to initially set the symbol rate to a low value and then increase the symbol rate stepwise.

According to the present embodiment, when the extent of multipath interference is small, high-rate transmission is made possible by setting the symbol rate to a high value. In this case, the correlated bandwidth often widens, making the apparatus advantageous for a high symbol rate, i.e., wideband transmission.

Radio communications devices using frequencies of 10 GHz or higher, particularly frequencies of millimeter waves (30 to 300 GHz), even with an array of antennas, have an antenna size smaller than radio communications devices using the microwave band. For example, if a radio communications device uses a frequency of 60 GHz, then the antenna interval is about 2.5 mm for a one-half wavelength and about 2.5 cm for 10 wavelengths. In terms of size, the radio communications device can be used as a portable terminal or as radio communications device in offices and homes.

Figure 6:
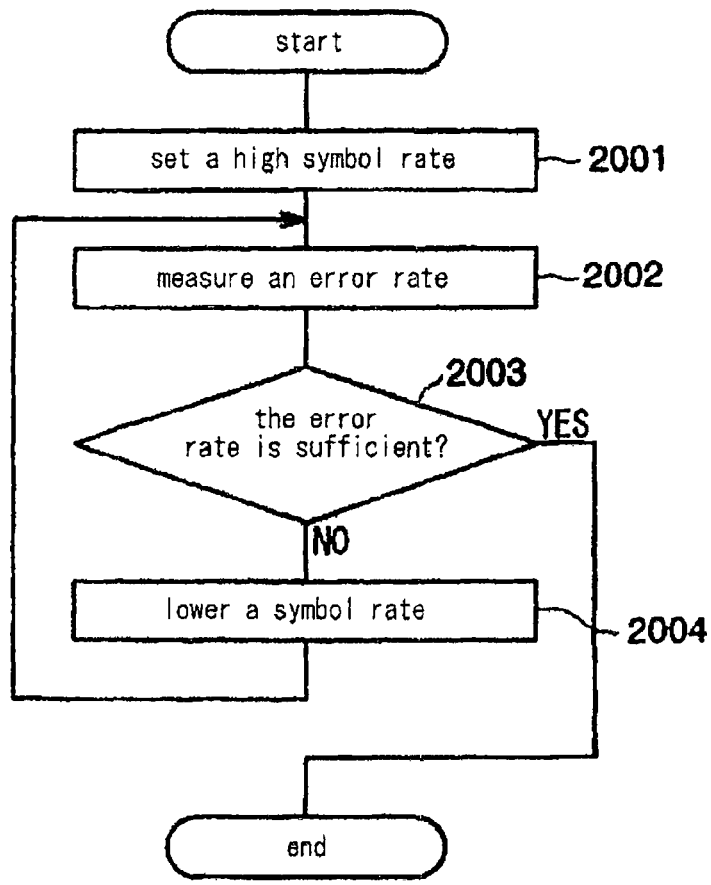
FIG. 6 is a flowchart of a process of determining a symbol rate according to a first variant.

A first variant of the first embodiment will be described below with reference to FIG. 6. The first variant is concerned with another process of determining a symbol rate. The radio communications device according to the first variant is structurally identical to the radio communication device according the first embodiment, and is capable of changing the symbol rate based on the modulation control signal and the propagating situation communication signal.

Initially, a symbol rate is set to a high value in symbol rate setting units 117, 122 in step 2001. Specifically, a high symbol rate is set in modulator 105 and demodulator 120. In step 2002, error rate measuring unit 112 measures an error rate. In step 2003, propagation detecting circuit 123 determines whether or not the error rate is in a range which is sufficiently allowable for communications. If the error rate is not sufficiently allowable, then the symbol rate is lowered by one level based on the modulation control signal and the propagating situation communication signal in step 2004. Specifically, a lower symbol rate is lowered by one level in modulator 105 and demodulator 120. Thereafter, control goes back to step 2002 to measure an error rate again under new conditions. The symbol rate is lowered until the error rate falls within the sufficiently allowable range. Therefore, the symbol rate is lowered until the error rate becomes sufficiently low.

The above process can be carried out prior to the start of communications. However, even during data communications, the bit error rate, the frame error rate, the packet error rate, and the retransmission request rate (retransmission rate) may be monitored, and the symbol rate may be lowered to make the numerical values of these rates sufficiently lower. Furthermore, the first variant may include a process wherein if the error rates are sufficiently lowered, then it is determined that multipath interference is reduced and the symbol rate is increased to increase the transmission rate again. The present variant offers the same advantages as the first embodiment, but allows conditions to be set more highly depending on the situation for high-rate transmission.

Figure 7:
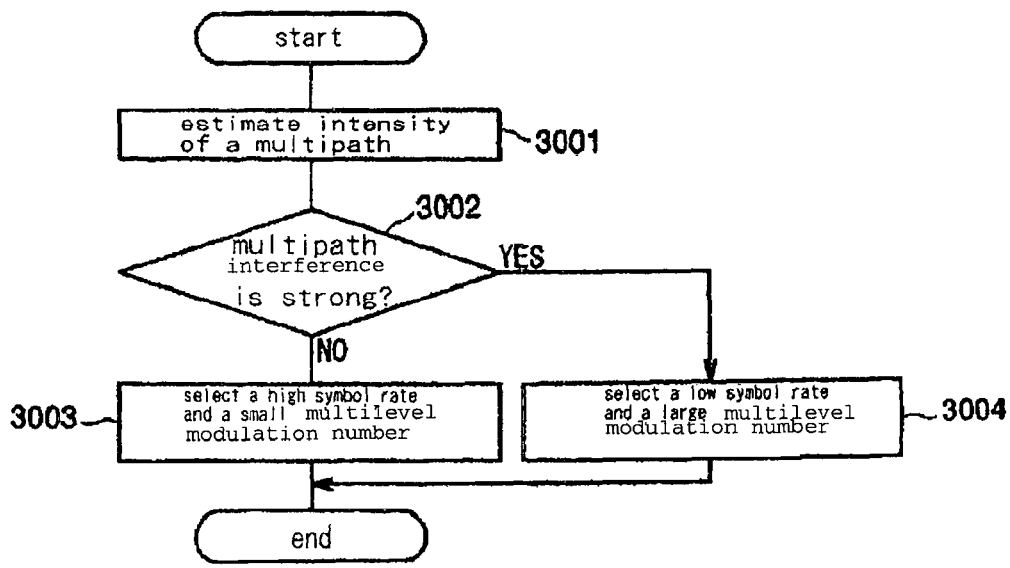
FIG. 7 is a flowchart of a process of determining a symbol rate and the multilevel modulation number (or index) according to a second variant.

A second variant of the first embodiment will be described below with reference to FIG. 7. The second variant is concerned with a process of determining a symbol rate and the multilevel modulation number (or index). The radio communications device according to the second variant is structurally identical to the radio communication device according the first embodiment, and is capable of changing the multilevel modulation number (or index) and the symbol rate based on the modulation control signal and the propagating situation communication signal.

In step 3001, propagation detecting circuit 123 estimates the intensity of multipath interference. If it is determined that multipath interference is weak in step 3002, then the symbol rate is set to a high value and the multilevel modulation number (or index) used to modulate the input transmission data is set to a small value in step 3003. Specifically, symbol rate setting units 117, 122 and modulation mode setting units 118, 123 are set to those values. If it is determined that the multipath interference is strong, then the symbol rate is set to a low value and the multilevel modulation number (or index) used to demodulate the reception signals is set to a large value in step 3004. Specifically, symbol rate setting units 117, 122 are set to the high value or low value of the symbol rate based on the intensity of the multipath interference and the number of values used for modulation and demodulation are set in the modulation mode setting units 118, 123 based on the intensity of the multipath interference. Using the symbol rate and the multilevel modulation number (or index) thus set, subsequent communications are performed.

Multipath interference may be determined in the same manner as described in the first embodiment. According to the present variant, if the extent of a multipath interference is small, then the symbol rate may be increased to perform high-rate transmission. Even if multipath interference is strong and the correlated bandwidth is small, the symbol rate may be lowered and the signal band may be narrowed to enable efficient transmission.

Figure 8:
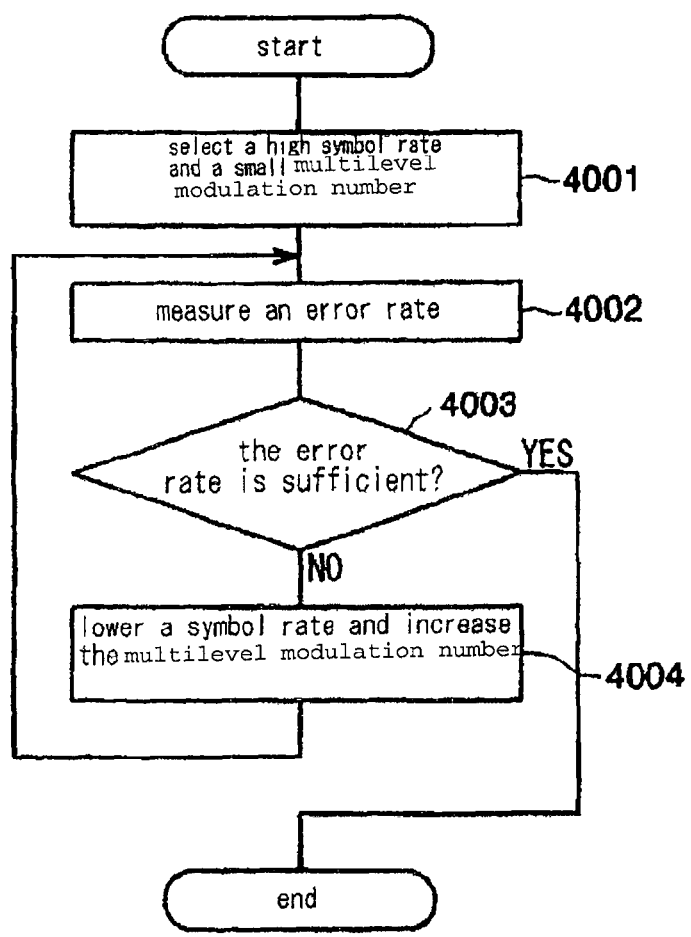
FIG. 8 is a flowchart of a process of determining a symbol rate and the multilevel modulation number (or index) according to a third variant.

A third variant of the first embodiment will be described below with reference to FIG. 8. The third variant is concerned with another process of determining a symbol rate and the multilevel modulation number (or index). The radio communications device according to the third variant is structurally identical to the radio communication device according the first embodiment, and is capable of changing the multilevel modulation number (or index) and the symbol rate based on the modulation control signal and the propagating situation communication signal.

Initially, in step 4001, the symbol rate is set to a high value and the multilevel modulation number (or index) is set to a low value in symbol rate setting units 117, 122 as initial states. In step 4002, error rate measuring unit 112 measures an error rate. In step 4003, it is determined whether or not the error rate is in a range which is sufficiently allowable in communications. If the error rate is not sufficiently allowable, then the multilevel modulation number (or index) is increased and the symbol rate is set to a lower value in step 4004. Control goes back to step 4002 to measure an error rate again under new conditions. The symbol rate is lowered and the multilevel modulation number (or index) is increased until the error rate falls within the sufficiently allowable range. Therefore, the symbol rate is lowered until the error rate becomes sufficiently low and the number of multiple values is increased.

The above process can be carried out prior to the start of communications. However, even during data communications, the bit error rate, the frame error rate, the packet error rate, and the retransmission request rate may be monitored, and the symbol rate may be appropriately lowered and the multilevel modulation number (or index) may be appropriately increased to make the numerical values of these rates sufficiently lower. Furthermore, the-third variant may include a process wherein if the error rates are sufficiently lowered, then it is determined that the multipath interference is reduced and the symbol rate is increased to increase the transmission rate again. The present variant offers the-same advantages as the first variant, but allows conditions to be set more highly depending on the situation for high-rate transmission.

Figure 9:
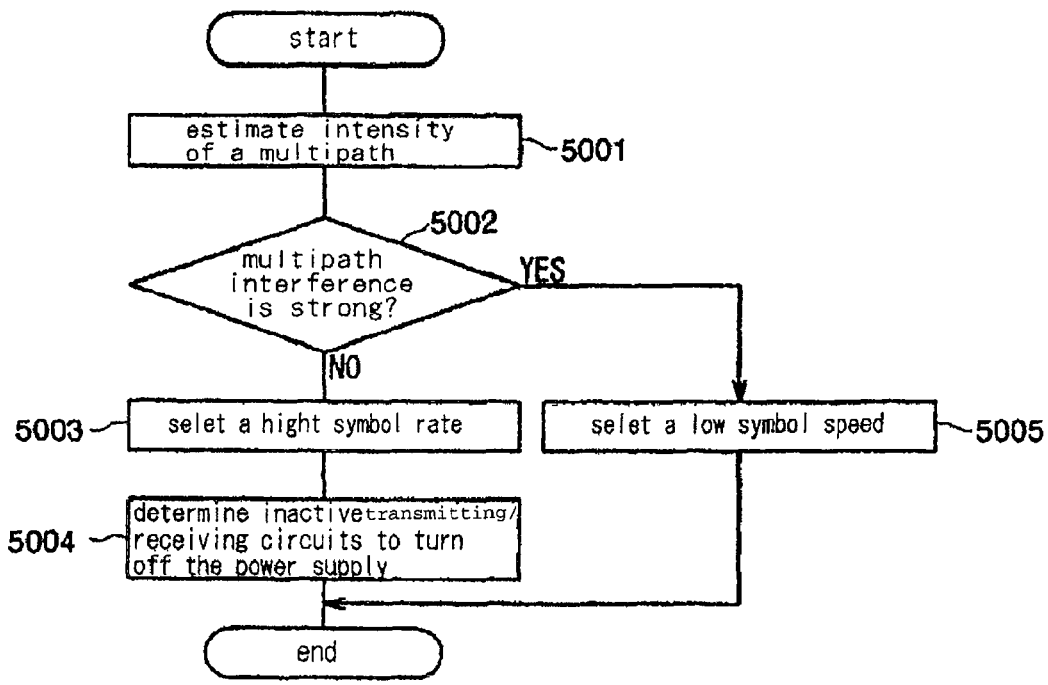
FIG. 9 is a flowchart of a process of determining a symbol rate according to a fourth variant.

A fourth variant of the first embodiment will be described below with reference to FIG. 9. The fourth variant is concerned with an operation process including a process of determining a symbol rate. According to the fourth variant, the radio communication device is structurally identical to the radio communication device according to the first embodiment, and is capable of changing the symbol rate based on the modulation control signal and the propagating situation communication signal.

In step 5001, the intensity of multipath interference is estimated according to the process described in the first embodiment, for example. If it is determined that multipath interference is strong in step 5002, then the symbol rate is set to a low value in step 5005. If it is determined that multipath interference is weak, then the symbol rate is set to a high value in step 5003. In this case, the power supplies of those transmitting and receiving circuits which do not contribute to the transmission rate are turned off by power supply control circuits 103, 109 in order to reduce electric power consumption in step 5004. Stated otherwise, the power supplies of those circuits which do not operate are turned off to reduce electric power consumption.

In a line-of-sight environment with reduced multipath interference, the correlation between antenna elements increases. Therefore, even if MIMO technology is employed, the transmission capacity is not increased and a spatial diversity effect is not produced. This tendency is particularly strong in radio communications at frequencies of 10 GHz or higher, particularly millimeter waves (30 to 300 GHz) frequencies, because no local scattering is expected. Consequently, even if priority is given to the reduction of electric power consumption, communication quality (transmission rate, SNR, etc.) is not greatly degraded. The present variant offers the same advantages as the first embodiment, but is effective to avoid unnecessary consumption of electric power in the absence of multipath interference.

Figure 10:
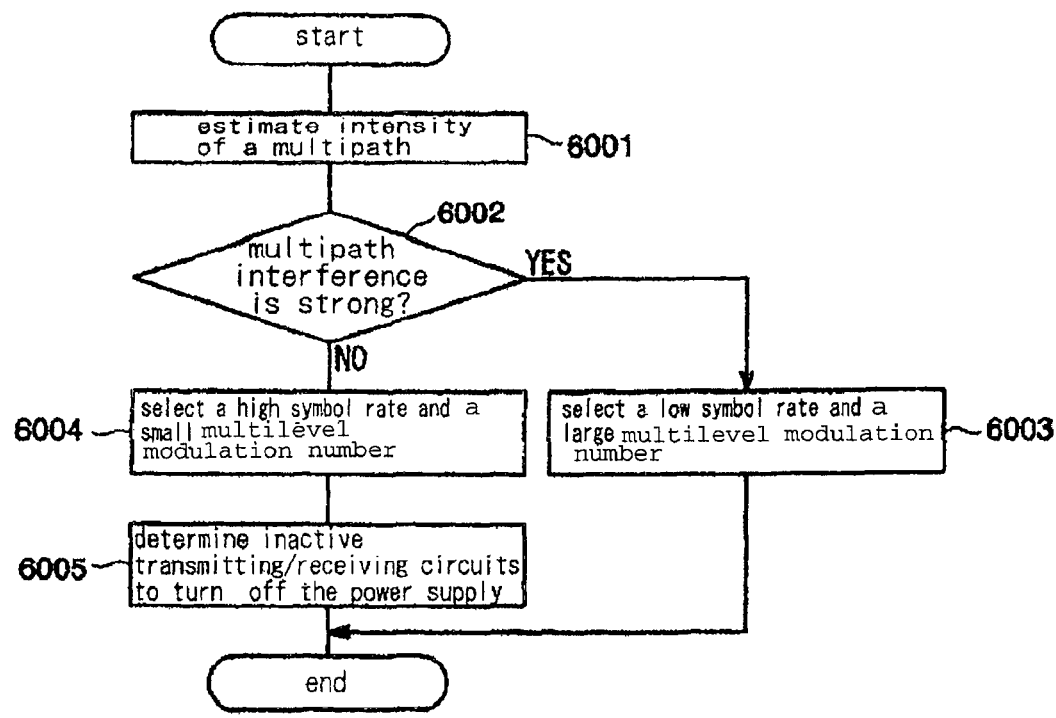
FIG. 10 is a flowchart of a process of determining a symbol rate and the multilevel modulation number (or index) according to a fifth variant.

A fifth variant of the first embodiment will be described below with reference to FIG. 10. The fifth variant is concerned with another operation process including a process of determining a symbol rate and the multilevel modulation number (or index). The radio communications device according to the fifth variant, is structurally identical to the radio communications device according the first embodiment, and is capable of changing the multilevel modulation number (or index) and the symbol rate based on the modulation control signal and the propagating situation communication signal.

Initially, in step 6001, the intensity of multipath interference is estimated according to the process described in the first embodiment, for example. If it is determined that multipath interference is strong in step 6002, then the symbol rate is set to a low value and the multilevel modulation number (or index) is set to a high value in step 6003. If it is determined that multipath interference is weak, then the symbol rate is set to a high value and the multilevel modulation number (or index) is set to a low value in step 6004. In this case, the power supplies of those transmitting and receiving circuits which do not contribute to the transmission rate are turned off in order to reduce electric power consumption in step 6005. Stated otherwise, the power supplies of those circuits which do not operate are turned off to reduce electric power consumption.

The present variant differs from the fourth variant in that if it is determined that interference is weak, then the-symbol rate is set to a high value and the multilevel modulation number (or index) is set to a low value, and if it is determined that the interference is. strong, then the symbol rate is set to a low value and the multilevel modulation number (or index) is set to a high value. The present variant offers the same advantages as the fourth variant, but allows conditions to be set more highly depending on the situation for high-rate transmission.

2nd EMBODIMENT

Figure 11:
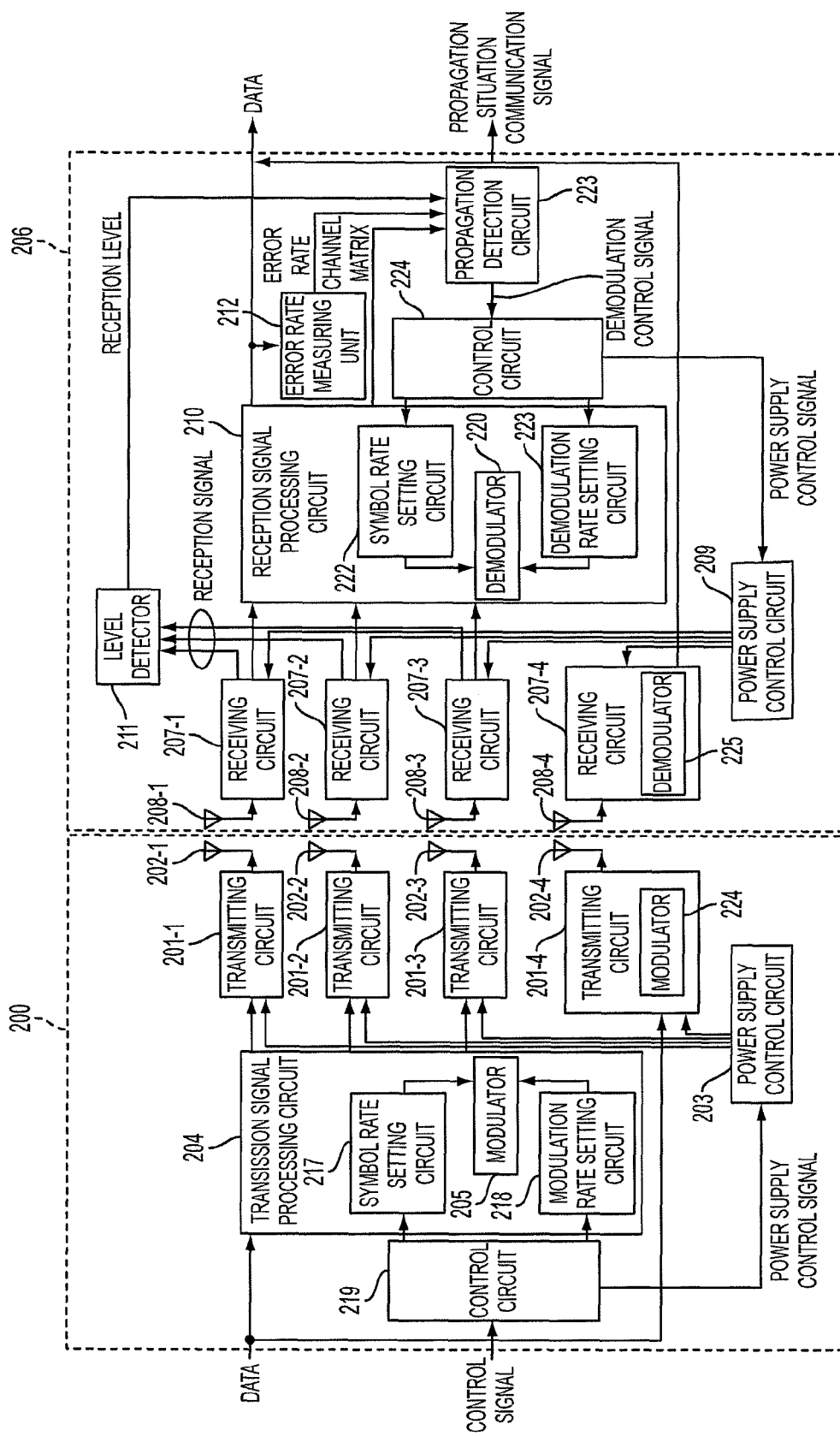
FIG. 11 is a block diagram of a radio communication device according to a second embodiment of the present invention.

FIG. 11 is a block diagram of a radio communications device according to a second embodiment of the present invention. According to the second embodiment, the radio communications device has a direct modulation/ demodulation mode and a indirect modulation/demodulation mode. The direct modulation mode refers to a process of modulating transmission data directly into a transmission carrier. The indirect modulation mode refers to a process of processing transmission data, thereafter modulating the processed transmission data into a transmission carrier and up-converting the transmission carrier into a carrier in a radio frequency band. The direct demodulation mode refers to a process of modulating a reception signal directly into reception data. The indirect demodulation mode refers to a process of down-converting the carrier from the radio frequency band, demodulating a reception signal, and thereafter processing the signal into reception data.

The radio communications device has transmitter 200 and receiver 206. Since communications are normally bidirectional, a plurality of radio communications devices are positioned in facing relation to each other for communications therebetween. In this embodiment, transmitter 200 and receiver 206 are a transmitter and a receiver, respectively, of radio communications devices that face each other.

Transmitter 200 comprises antennas 202-1 through 202-4, transmitting circuit 201-1 in the indirect modulation mode connected to antenna 202-1, transmitting circuit 201-2 in the indirect modulation mode connected to antenna 202-2, transmitting circuit 201-3 in the indirect modulation mode connected to antenna 202-3, transmitting circuit 201-4 in the direct modulation mode connected to antenna 202-4 and incorporating modulator 224, power supply control circuit 203, transmission signal processing circuit 204, and control circuit 219. Transmitting circuits 201-1 through 201-3 are supplied with transmission signals through transmission signal processing circuit 204, and transmitting circuit 201-4 is supplied with a transmission signal directly instead of through transmission signal processing circuit 204.

Power supply control circuit 203 controls power supplies whose power is to be supplied to transmitting circuits 201-1 through 201-4 based on a power supply control signal from control circuit 219. Transmission signal processing circuit 204 has, in addition to a modulating function, at least one of a coding function with respect to an MIMO process and a weighting/mapping function. Transmission signal processing circuit 204 includes modulator 205, symbol rate setting unit 217, and modulation rate setting unit 218, and is capable of changing a symbol rate and the multilevel modulation number (or index) according to a modulation control signal. Transmission signal processing circuit 204 modulates data input to transmitter 200 in modulator 205, and outputs the modulated data as transmission signals to transmitting circuits 201-1 through 202-3.

Receiver 206 comprises antennas 208-1 through 208-4, receiving circuit 207-1 in the indirect demodulation mode connected to antenna 208-1, receiving circuit 207-2 in the indirect demodulation mode connected to antenna 208-2, receiving circuit 207-3 in the indirect demodulation mode connected to antenna 208-3, receiving circuit 207-4 in the direct demodulation mode connected to antenna 2084 and incorporating demodulator 225, power supply control circuit 209, reception signal processing circuit 210, level detector 211, error rate measuring unit 212, propagation detecting circuit 223, and control circuit 224. Power supply control circuit 209 controls power supplies whose power is to be supplied to receiving circuits 207-1 through 207-4 based on a power supply control signal from control circuit 224. Reception signal processing circuit 210 has, in addition to a demodulating function, at least one decoding function with respect to a MIMO process and a weighting/demapping function. Reception signal processing circuit 210 demodulates reception signals input from receiving circuits 207-1 through 207-3 in demodulator 220, and outputs the demodulated data as reception data. Reception signal processing circuit 210 has a function to estimate a channel matrix. Reception signal processing circuit 210 estimates a channel matrix based on the reception signals input from receiving circuits 207-1 through 207-3, and outputs the estimated channel matrix. Level detector 211 detects a reception level based on reception level signals input from receiving circuits 207-1 through 207-3, and outputs the detected reception level. Error rate measuring unit 212 measures a bit error rate or a frame error rate based on the reception data output from reception signal processing circuit 210 and receiving circuit 207-4, and outputs the error rate. Propagation detecting circuit 223 is supplied with the reception level, the error rate, and the channel matrix, determines the intensity of multipath interference, and outputs a modulation control signal and a propagating situation communication signal that is equivalent to the modulation control signal. Control circuit 224 outputs the power supply control signal to power supply control circuit 209, and sets a symbol rate and a demodulation mode respectively in symbol rate setting unit 222 and demodulation mode setting unit 223 based on the modulation control signal. The propagating situation communication signal is sent to control circuit 219 of transmitter 200, and control circuit 219 sets a symbol rate and a modulation mode respectively in symbol rate setting unit 217 and modulation rate setting unit 218.

Transmitting circuit 201-4 and receiving circuit 207-4 employ any one of ASK, FSK, BPSK, QPSK and DQPSSK as a modulation/demodulation process. Transmitting circuit 201-4 modulates input data into a transmission carrier, and receiving circuit 207-4 demodulates data directly from a reception signal. Such modulation/demodulation is referred to as direct modulation/demodulation. A symbol rate used in transmitting circuit 201-4 and receiving circuit 207-4 is set to a value higher than the symbol rate used in transmitting circuits 201-1 through 201-3 and in receiving circuits 207-1 through 207-3 in the indirect modulation/demodulation mode. The indirect modulation/demodulation mode may employ either multilevel PSK or multilevel QAM, or OFDM using multilevel PSK or multilevel QAM for primary modulation.

Figure 12:
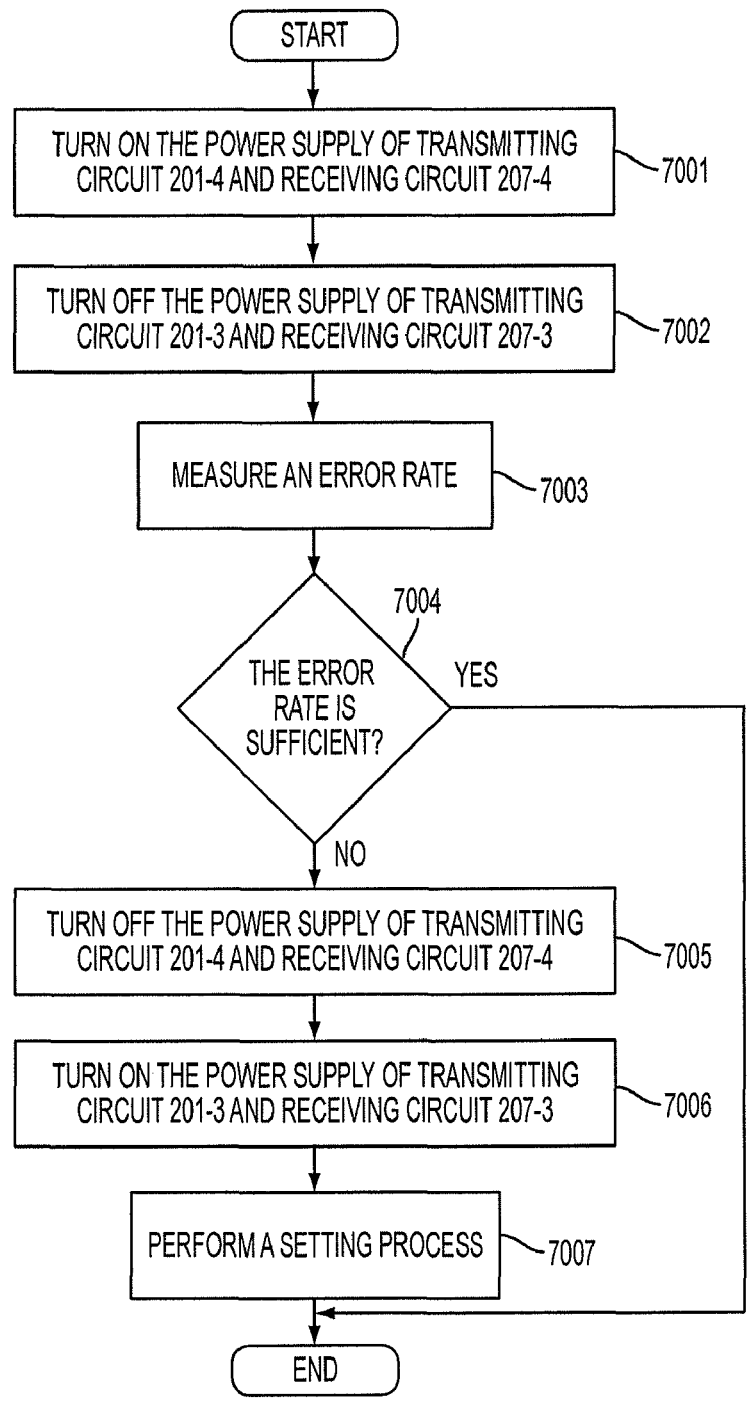
FIG. 12 is a flowchart of a process of setting a transmitter and a receiver according to the second embodiment of the present invention.

The transmitting and receiving circuits of the radio communications device are set to operate as shown in FIG. 12. Initially, in Step 7001, the power supply of transmitting circuit 201-4 is turned on by power supply control circuit 203, and the power supply of receiving circuit 207-4 is turned on by power supply control circuit 209. In step 7002, the power supplies of transmitting circuits 201-1 through 201-3 are turned off by power supply control circuit 203, and the power supplies of receiving circuits 207-1 through 207-3 are turned off by power supply control circuit 209. Then, in step 7003, error rate measuring unit 212 measures an error rate. In step 7004, propagation detecting circuit 223 determines whether or not the error rate is in a range which is sufficiently allowable or not for communications. If the error rate is sufficiently allowable, then subsequent communications are performed with the above configuration. Specifically, communications are performed using transmitting circuit 201-4 and receiving circuit 207-4. If it is determined that the error rate is not sufficiently allowable, then the power supply of transmitting circuit 201-4 is turned off by power supply control circuit 203, and the power supply of receiving circuit 207-4 is turned off by power supply control circuit 209 in step 7005. Therefore, transmitting circuit 201-4 and receiving circuit 207-4 are not operated. In step 7006, the power supplies of transmitting circuits 201-1 through 201-3 are turned on by power supply control circuit 203, and the power supplies of receiving circuits 207-1 through 207-3 are turned on by power supply control circuit 209, to make these circuits operable. Finally, a setting process is performed in step 7007 in which radio communications according to the normal MIMO process are set, or a symbol rate and the multilevel modulation number (or index) is determined according to any one of the processes described above in the first embodiment and the variants thereof.

According to the present embodiment, if multipath interference is weak, then the power supplies of circuits which consume a large amount of electric power, such as high-rate D/A converters (DACs), A/D converters (ADCs), MIMO processing circuits, and time-space coding circuits are turned off, for thereby achieving low electric power consumption. If ASK is used for direct modulation/demodulation, then as described in the literature by K. Ohata referred to above, the transmission rate of 1.25 Gbits/sec. is achieved for radio communications, using the 60 GHz band. At this time, high-rate switches and detectors are required as devices that are necessary for modulation/demodulation. However, these devices generally consume a smaller amount of electric power than the above circuits. Therefore, if multipath interference is weak, then high-rate wide-band millimeter-wave communications can be achieved with low electric power consumption in the direct modulation/demodulation mode. If multipath interference is strong, then though the electric power consumption increases, the possibility of communication interruptions due to multipath-interference is lowered, and hence communications can be continued while maintaining a certain degree of transmission rate.

Figure 13:
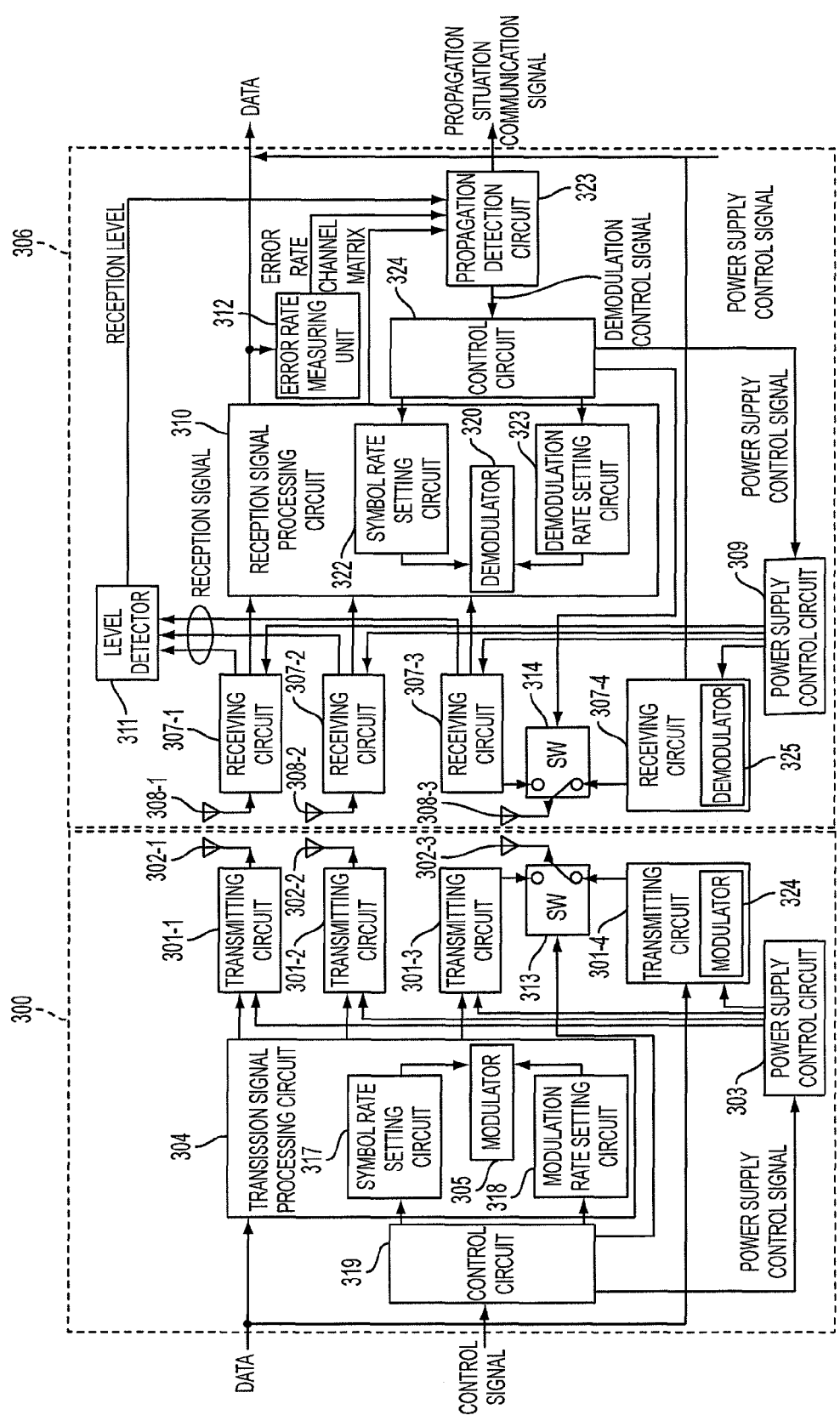
FIG. 13 is a block diagram of a radio communication device according to a variant of the second embodiment of the present invention.

A variant of the second embodiment wall be described below with reference to FIG. 13. FIG. 13 is a block diagram of a radio communication device according to the present variant. The radio communications device according to the present variant is essentially structurally the same as the radio communication device according to the second embodiment shown in FIG. 11, with components being denoted by different reference characters. The radio communications device has transmitter 300 and receiver 306.

Transmitter 300 comprises antennas 302-1 through 302-3, transmitting circuit 301-1 in the indirect modulation mode connected to antenna 302-1, transmitting circuit 301-2 in the indirect modulation mode connected to antenna 302-2, transmitting circuit 301-3 in the indirect modulation mode, transmitting circuit 301-4 in the direct modulation mode incorporating modulator 324, power supply control circuit 303, transmission signal processing circuit 304, and control circuit 319. Transmitting circuit 301-3 and transmitting circuit 301-4 are connected to antenna 302-3 through switch 313. Transmitting circuits 301-1 through 301-3 are supplied with transmission data through transmission signal processing circuit 304, and transmitting circuit 301-4 is supplied with transmission data directly instead of through transmission signal processing circuit 304.

Power supply control circuit 303 controls power supplies whose power is to be supplied to transmitting circuits 301-1 through 301-4 based on a power supply control signal from control circuit 319. Transmission signal processing circuit 304 has, in addition to a modulating function, at least one of a coding function with respect to a MIMO process and a weighting/mapping function. Transmission signal processing circuit 304 includes modulator 305, symbol rate setting unit 317, and modulation rate setting unit 318, and is capable of changing a symbol rate and the multilevel modulation number (or index) according to a modulation control signal. Transmission signal processing circuit 304 modulates data that is input to transmitter 300 in modulator 305, and outputs the modulated data as transmission signals to transmitting circuits 301-1 through 301-3.

Receiver 306 comprises antennas 308-1 through 308-3, receiving circuit 307-1 in the indirect demodulation mode connected to antenna 308-1, receiving circuit 307-2 in the indirect demodulation mode connected to antenna 308-2, receiving circuit 307-3 in the indirect demodulation mode, receiving circuit 307-4 in the direct demodulation mode incorporating demodulator 325, power supply control circuit 309, reception signal processing circuit 310, level detector 311, error rate measuring unit 312, propagation detecting circuit 323, and control circuit 324. Receiving circuit 307-3 and receiving circuit 307-4 are connected to antenna 308-3 through switch 314. Power supply control circuit 309 controls power supplies whose power is to be supplied to receiving circuits 307-1 through 307-4 based on a power supply control signal from control circuit 324. Reception signal processing circuit 310 has, in addition to a demodulating function, at least one of a decoding function with respect to a MIMO process and a weighting/demapping function. Reception signal processing circuit 310 demodulates reception signals that are input from receiving circuits 307-1 through-3 in demodulator 320, and outputs the demodulated data as reception data. Reception signal processing circuit 310 estimates a channel matrix based on the reception signals that are input from receiving circuits 307-1 through-3, and outputs the estimated channel matrix. Level detector 311 detects a reception level based on reception level signals that are input from receiving circuits 307-1 through-3, and outputs the detected reception level. Error rate measuring unit 312 measures a bit error rate or a frame error rate based on the reception data output from reception signal processing circuit 310 and receiving circuit 307-4, and outputs the error rate. Propagation detecting circuit 323 is supplied with the reception level, the error rate, and the channel matrix, determines the intensity of multipath interference, and outputs a modulation control signal and a propagating situation communication signal that is equivalent to the modulation control signal. Control circuit 324 outputs the power supply control signal to power supply control circuit 309, and sets a symbol rate and a demodulation mode respectively in symbol rate setting unit 322 and demodulation mode setting unit 323 based on the modulation control signal. The propagating situation communication signal is sent to control circuit 319 of transmitter 300, and control circuit 319 sets a symbol rate and a modulation mode respectively in symbol rate setting unit 317 and modulation rate setting unit 318.

Transmitting circuit 301-4 and receiving circuit 307-4 employ any one of ASK, FSK, BPSK, QPSK and DQPSSK as a modulation/demodulation process. Transmitting circuit 301-4 modulates input data into a transmission carrier and receiving circuit 307-4 demodulates data directly from a reception signal. A symbol rate used in transmitting circuit 301-4 and receiving circuit 307-4 is set to a value higher than the symbol rate used in transmitting circuits 301-1 through 301-3 and receiving circuits 307-1 through 307-3 in the indirect modulation/demodulation mode.

The radio communication device according to the present variant differs from the radio communication device shown in FIG. 11 in that antennas are shared. Transmitting circuit 301-3 and transmitting circuit 301-4 are connected to antenna 302-3 through switch 313. Receiving circuit 307-3 and receiving circuit 307-4 are connected to antenna 308-3 through switch 314. Antenna 302-3 and antenna 308-3 are shared. Switches 313, 314 that are operated by the power supply control signals are provided respectively in transmitter 300 and receiver 306.

The present variant offers the same advantages as those described in the second embodiment, but additionally makes the apparatus smaller in size because the antennas are shared. Though the switches are used in the illustrated variant, general antenna sharing units may be employed instead.

3rd EMBODIMENT

Figure 14:
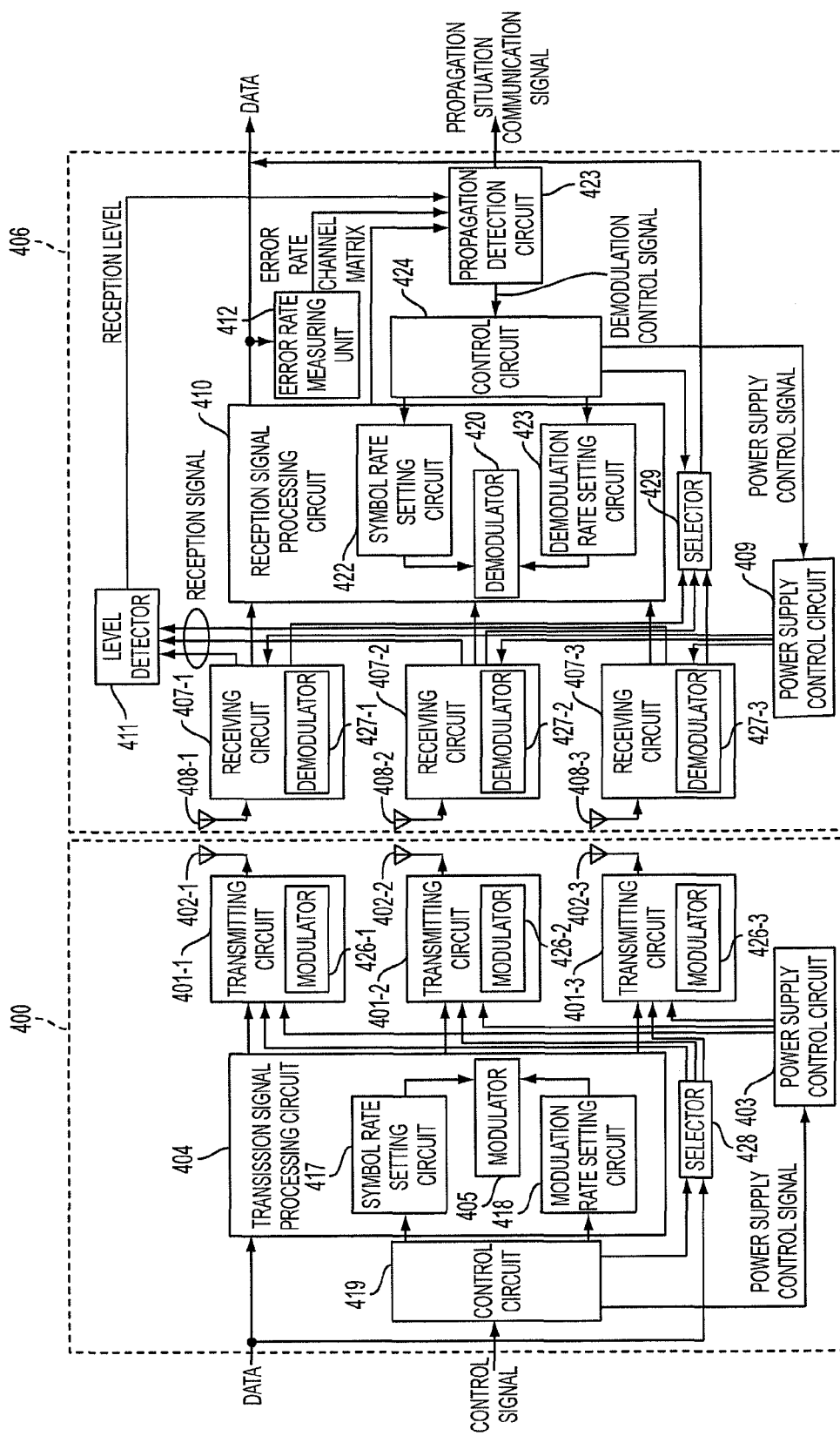
FIG. 14 is a block diagram of a radio communication device according to a third embodiment of the present invention.

FIG. 14 is a block diagram of a radio communication device according to a third embodiment of the present invention. The radio communication device has transmitter 400 and receiver 406. Since communications are normally bidirectional, a plurality of radio communication device are positioned in facing relation to each other for communications therebetween. In this embodiment, transmitter 400 and receiver 406 are a transmitter and a receiver, respectively, of radio communications devices that face each other.

Transmitter 400 comprises antennas 402-1 through 402-3, transmitting circuits 401-1 through 401-3 connected respectively to antennas 402-1 through 402-3, power supply control circuit 403, transmission signal processing circuit 404, control circuit 419, and selector 428. Each of transmitting circuits 401-1 through 401-3 is capable of selecting a direct modulation mode or a indirect modulation mode as a modulation process. Transmitting circuits 401-1 through 401-3 are supplied with transmission signals through transmission signal processing circuit 404 and with data signals through selector 428. Selector 428-makes a setting for selecting transmission signals or data signals to be used by transmitting circuits 401-1 through 401-3. Transmitting circuits 401-1 through 401-3 have respective modulators 426-1 through 426-3 for modulating a carrier with the data signals that are input through selector 428.

Power supply control circuit 403 controls power supplies whose power is to be supplied to transmitting circuits 401-1 through 401-3 based on a power supply control signal from control circuit 419. Transmission signal processing circuit 404 has, in addition to a modulating function, at least one coding function with respect to a MIMO process and a weighting/mapping function. Transmission signal processing circuit 404 includes modulator 405, symbol rate setting unit 417, and modulation rate setting unit 418, and is capable of changing a symbol rate and the multilevel modulation number (or index) according to a modulation control signal. Transmission signal processing circuit 404 modulates input data in modulator 405, and outputs the modulated data as transmission signals to transmitting circuits 401-1 through 401-3. Selector 428 has functions to distribute data to transmitting circuits 401-1 through 401-3 and to select the direct modulation mode or the indirect modulation mode as the modulation process.

Receiver 406 comprises antennas 408-1 through 408-3, receiving circuits 407-1 through 407-3 connected respectively to antennas 408-1 through 408-3 and each capable of selecting the direct demodulation mode or the indirect demodulation mode, power supply control circuit 409, reception signal processing circuit 410, level detector 411, error rate measuring unit 412, selector 429, propagation detecting circuit 423, and control circuit 424. Receiving circuits 407-1 through 407-3 have respective demodulators 427-1 through 427-3 for demodulating reception signals that are input through antennas 408-1 through 408-3. Power supply control circuit 409 controls power supplies whose power is to be supplied to receiving circuits 407-1 through 407-4 based on a power supply control signal from control circuit 424. Reception signal processing circuit 410 has, in addition to a demodulating function, at least one decoding function with respect to a MIMO process and a weighting/demapping function. Reception signal processing circuit 410 demodulates reception signals that are input from receiving circuits 407-1 through 407-3 in demodulator 420, and outputs the demodulated data as reception data. Reception signal processing circuit 410 estimates a channel matrix based on the reception signals that are input from receiving circuits 407-1 through-3, and outputs the estimated channel matrix. Level detector 411 detects a reception level based on reception level signals that are input from receiving circuits 407-1 through 407-3, and outputs the detected reception level. Error rate measuring unit 412 measures a bit error rate or a frame error rate based on the reception data output from reception signal processing circuit 410 and selector 429, and outputs the error rate. Selector 429 has functions to distribute data output from receiving circuits 407-1 through 407-3 and to select the direct demodulation mode or the indirect demodulation mode as the demodulation process. Propagation detecting circuit 423 is supplied with the reception level, the error rate, and the channel matrix, determines the intensity of multipath interference, and outputs a modulation control signal and a propagating situation communication signal that is equivalent to the modulation control signal. Control circuit 424 outputs the power supply control signal to power supply control circuit 409, and sets a symbol rate and a demodulation mode respectively in symbol rate setting unit 422 and demodulation mode setting unit 423 based on the modulation control signal. The propagating situation communication signal is sent to control circuit 419 of transmitter 400, and control circuit 419 sets a symbol rate and a modulation mode respectively in symbol rate setting unit 417 and modulation rate setting unit 418.

Any one of ASK, FSK, BPSK, QPSK and DQPSSK is employed as the direct modulation/demodulation mode. Transmitter 400 modulates input data into a transmission carrier, and receiver 406 demodulates data directly from a reception signal. A symbol rate is set to a value higher than the symbol rate used in the transmitting circuits and the receiving circuits in the indirect modulation mode. The indirect modulation/demodulation mode may employ any one of multilevel PSK or multilevel QAM and OFDM using multilevel PSK or multilevel QAM for primary modulation.

Figure 15:
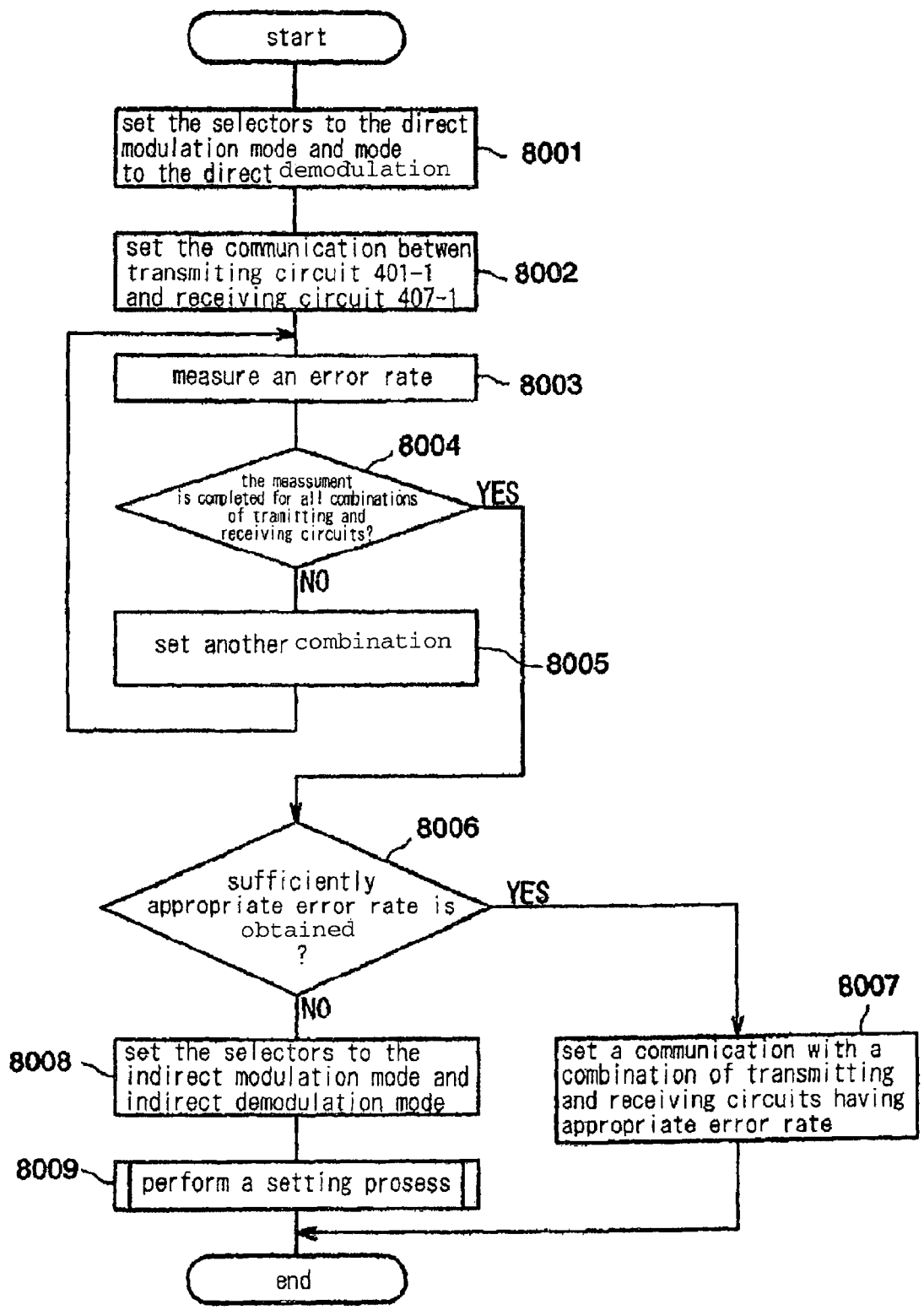
FIG. 15 is a flowchart of a process related to settings on a transmitter and a receiver according to the third embodiment of the present invention.

The present radio communications device performs a procedure for making settings on the transmitting and receiving circuits as shown in FIG. 15. In step 8001, control circuits 419, 424 set selector 428 to the direct modulation mode, and set selector 429 to the indirect demodulation mode. In this state, communications are performed in the direct modulation/demodulation mode. In step 8002, power control circuit 403 controls the power supply to supply electric power to transmitting circuit 401-1, and power control circuit 409 controls the power supply to supply electric power to receiving circuit 407-1. Therefore, transmitting circuit 401-1 and receiving circuit 407-1 are brought into a state capable of communicating with each other. In step 8003, error rate measuring unit 412 measures an error rate. Propagation detecting circuit 423 records the combination of transmitting and receiving circuits and the error rate. When the measurement of the error rate is finished, power supply control circuits 403, 409 control the power supplies to stop the supply of electric power to transmitting circuit 401-1 and receiving circuit 407-1. In step 8004, propagation detecting circuit 423 determines whether or not the measurement of error rates for all combinations of transmitting and receiving circuits is completed. If there is a combination of transmitting and receiving circuits for which an error rate has not yet been measured, then the combination of the transmitting and receiving circuits is changed, and transmitting and receiving circuits in another combination are energized into operation. Control then goes back to step 8003 to measure an error rate. If the measurement of error rates for all combinations of the transmitting and receiving circuits is completed, then propagation detecting circuit 423 looks for a combination of transmitting and receiving circuits with the best error rate from the recorded error rates corresponding to the combinations of the transmitting and receiving circuits. If the best error rate is determined as an error rate sufficiently appropriate for communications (low error rate), then subsequent communications are performed with that combination of transmitting and receiving circuits in step 8007. If the best error rate is not an error rate sufficiently appropriate for communications, then control circuits 419, 422 determine that the effect of multipath Interference is strong, and sets selector 428 to the indirect modulation mode and selector 429 to the indirect demodulation mode in step 8008. Finally, a setting process in the indirect modulation/demodulation mode is performed in step 8009 in which radio communications according to the normal MIMO process are set, or a symbol rate and the multilevel modulation number (or index) is determined according to any one of the processes described above in the first embodiment and in the variants thereof.

In the present embodiment, error rates are measured for all combinations of transmitting and receiving circuits. However, error rates may not be measured for all combinations of transmitting and receiving circuits. When it is determined that a sufficiently appropriate error rate is measured, then subsequent error rate measurements may be skipped, and communications may be performed with the combination of transmitting and receiving circuits for which the error rate has been measured. Electric power consumption may be reduced if the power supplies of transmitting and receiving circuits which are not used are turned off.

The present embodiment offers the same advantages as those described in the second embodiment and in the variant thereof. Though the transmitting and receiving circuits according to the present embodiment are slightly more complex, the number of antennas is smaller than in the second embodiment, and no switches are required, unlike in the variant of the second embodiment. Another advantage is that only one transmission amplifier of a transmitting circuit is connected to each antenna, and only one reception amplifier of a receiving circuit is connected to each antenna.

4th EMBODIMENT

Figure 16:
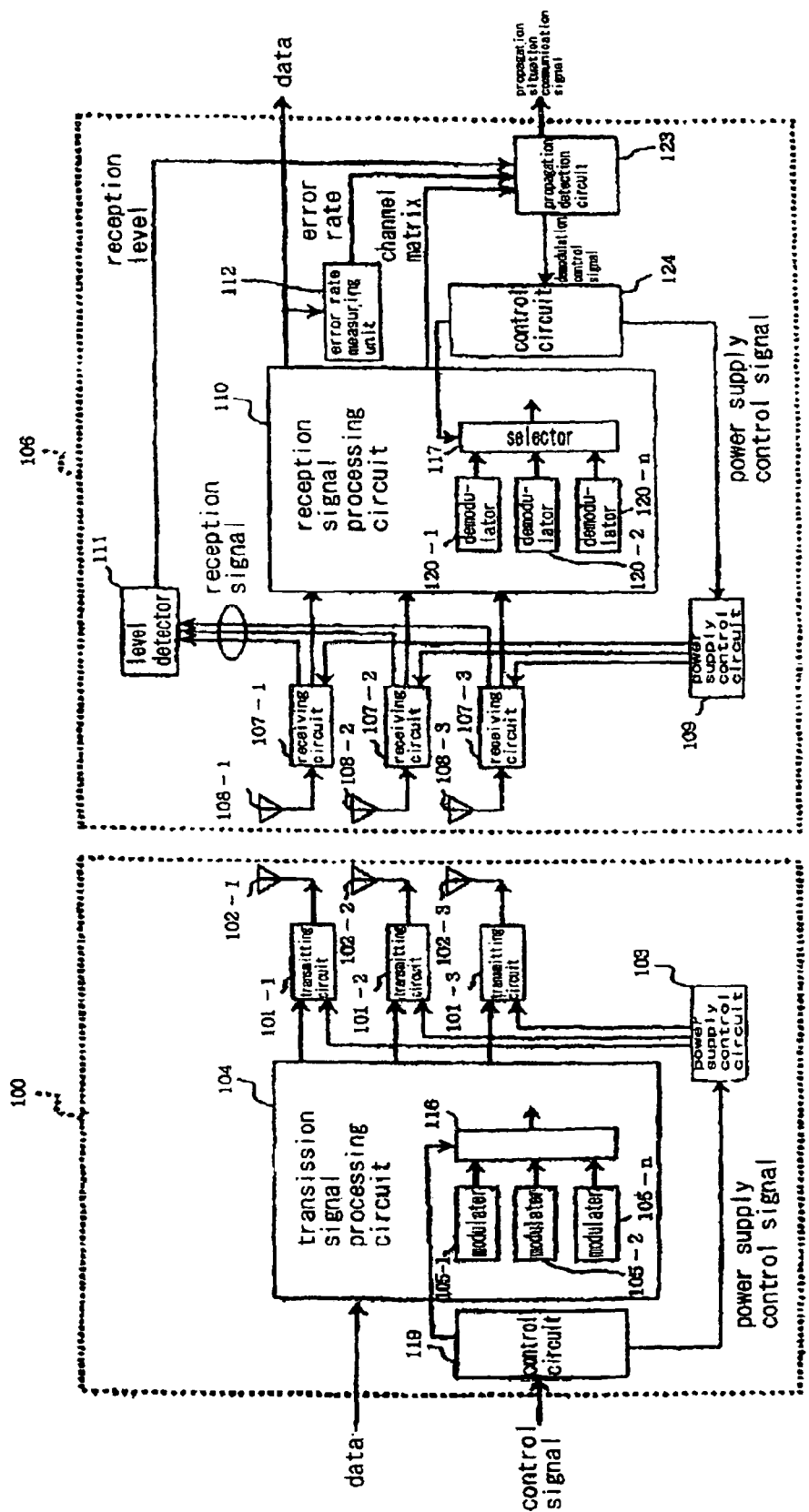
FIG. 16 is a block diagram of a radio communication device according to a fourth embodiment of the present invention.

FIG. 16 is a block diagram of a radio communication device according to a fourth embodiment of the present invention. The radio communication device according to the present embodiment has a plurality of modulators 105-1 through 105-n and selector 116 in place of modulator 105, symbol rate setting unit 117, and modulation rate setting unit 118 in transmitter 100 according to the first embodiment shown in FIG. 2, and also has a plurality of demodulators 120-1 through 120-n and selector 117 in place of demodulator 120, symbol rate setting unit 122, and demodulation rate setting unit 123 in receiver 106.

Modulators 105-1 through 105-n have combinations of different symbol rates and modulation modes. The output of one of modulators 105-1 through 105-n is selected by selector 116 under the control of control circuit 119. Demodulators 120-1 through 120-n have combinations of different symbol rates and demodulation modes. The output of one of demodulators 120-1 through 120-n is selected by selector 117 under the control of control circuit 124. Other structural and operational details of the radio communication device according to the present embodiment are the same as those of the radio communication device according to the first embodiment.

5th EMBODIMENT

Figure 17:
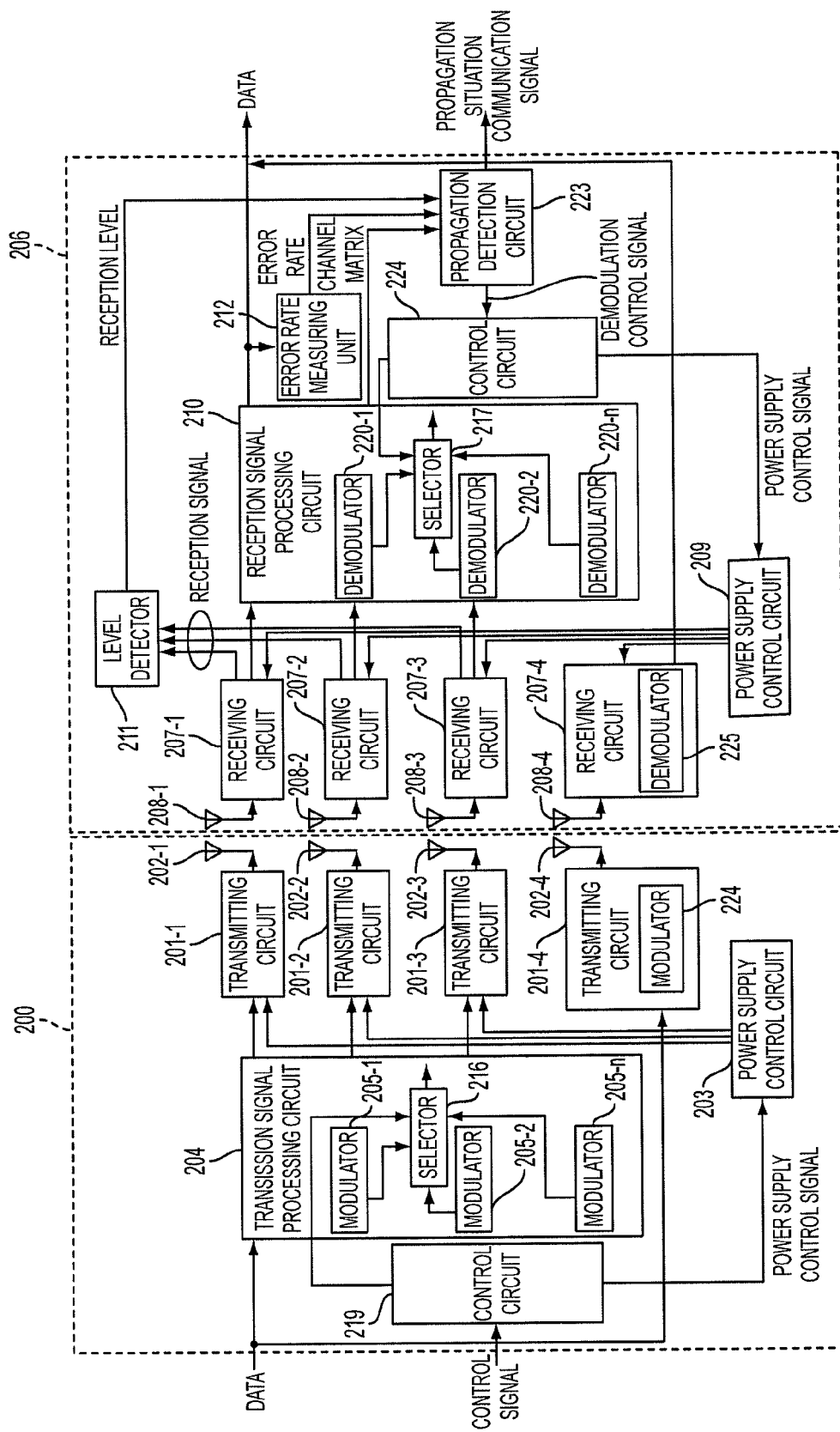
FIG. 17 is a block diagram of a radio communication device according to a fifth embodiment of the present-invention.

FIG. 17 is a block diagram of a radio communications device according to a fifth embodiment of the present invention. The radio communication device according to the present embodiment has a plurality of modulators 205-1 through 205-n and selector 216 in place of modulator 205, symbol rate setting unit 217, and modulation rate setting unit 218 in transmitter 200 according to the second embodiment shown in FIG. 11, and also has a plurality of demodulators 220-1 through 220-n and selector 217 in place of demodulator 220, symbol rate setting unit 222, and demodulation rate setting unit 223 in receiver 206.

Modulators 205-1 through 205-n have combinations of different symbol rates and modulation modes. The output of one of modulators 205-1 through 205-n is selected by selector 216 under the control of control circuit 219. Demodulators 220-1 through 220-n have combinations of different symbol rates and demodulation modes. The output of one of demodulators 220-1 through 220-n is selected by selector 217 under the control of control circuit 224. Other structural and operational details of the radio communication device according to the present embodiment are the same as those of the radio communication device according to the second embodiment.

Figure 18:
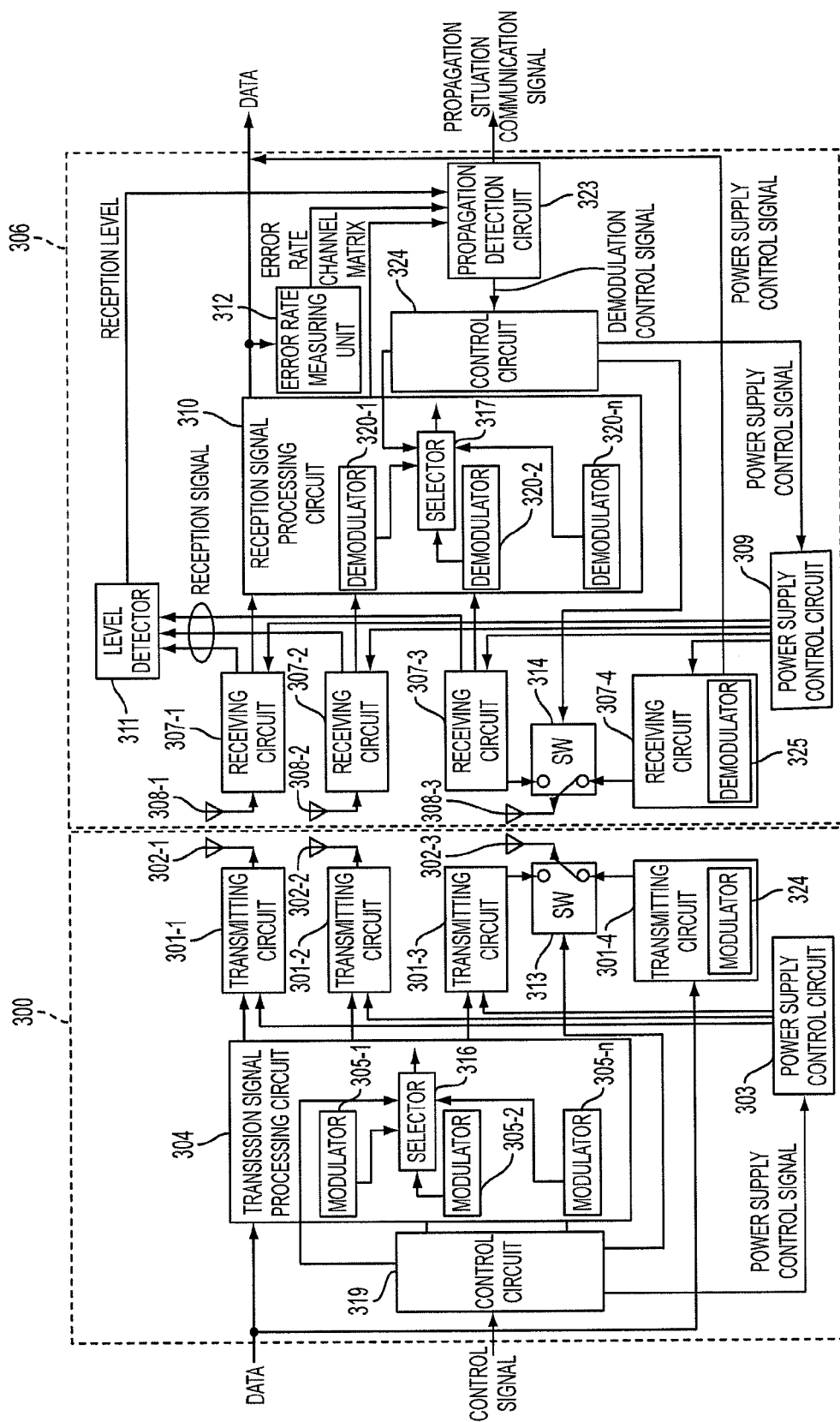
FIG. 18 is a block diagram of a radio communication device according to a variant of the fifth embodiment of the present invention.

FIG. 18 is a block diagram of a radio communications device according to a variant of the fifth embodiment of the present invention. The radio communication device according to the present variant has a plurality of modulators 305-1 through 305-n and selector 316 in place of modulator 305, symbol rate setting unit 317, and modulation rate setting unit 318 in transmitter 300 according to the variant of the second embodiment shown in FIG. 13, and also has a plurality of demodulators 320-1 through 320-n and selector 317 in place of demodulator 320, symbol rate setting unit 322, and demodulation rate setting unit 323 in receiver 306.

Modulators 305-1 through 305-n have combinations of different symbol rates and modulation modes. The output of one of modulators 305-1 through 305-n is selected by selector 316 under the control of control circuit 319. Demodulators 320-1 through 320-n have combinations of different symbol rates and demodulation modes. The output of one of demodulators 320-1 through 320-n is selected by selector 317 under the control of control circuit 324. Other structural and operational details of the radio communication device according to the present variant are the same as those of the radio communication device according to the variant of the second embodiment.

6th EMBODIMENT

Figure 19:
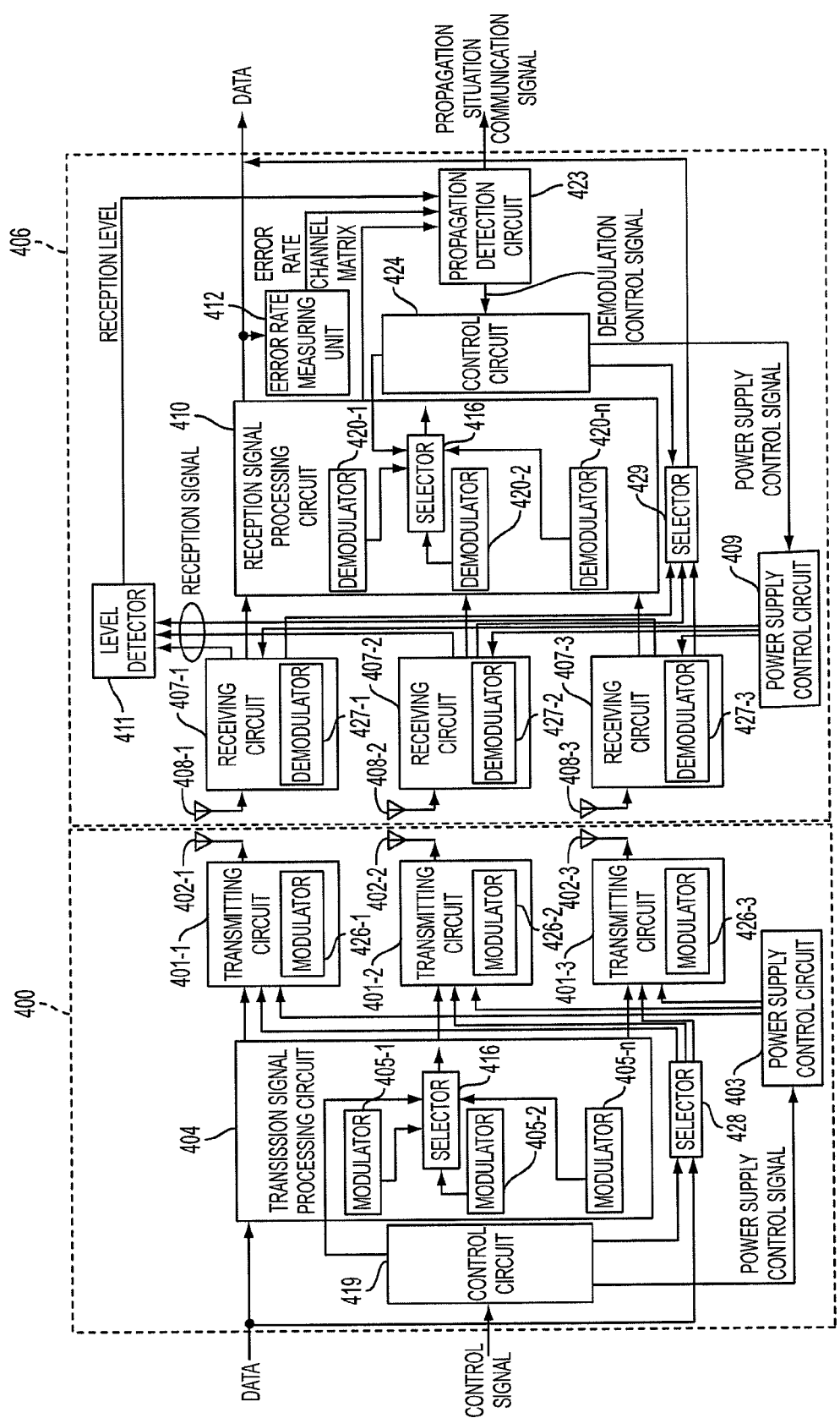
FIG. 19 is a block diagram of a radio communication device according to a sixth embodiment of the present invention.

FIG. 19 is a block diagram of a radio communications device according to a sixth embodiment of the present invention. The radio communications device according to the present embodiment has a plurality of modulators 405-1 through 405-n and selector 416 in place of modulator 405, symbol rate setting unit 417, and modulation rate setting unit 418 in transmitter 400 according to the third embodiment shown in FIG. 14, and also has a plurality of demodulators 420-1 through 420-n and selector 417 in place of demodulator 420, symbol rate setting unit 422, and demodulation rate setting unit 423 in receiver 406.

Modulators 405-1 through 405-n have combinations of different symbol rates and modulation modes. The output of one of modulators 405-1 through 405-n is selected by selector 416 under the control of control circuit 419. Demodulators 420-1 through 420-n have combinations of different symbol rates and demodulation modes. The output of one of demodulators 420-1 through 420-n is selected by selector 417 under the control of control circuit 424. Other structural and operational details of the radio communication device according-to the present embodiment are the same as those of the radio communication device according to the third embodiment.

As described above, it is possible to provide a radio communications device whose functions, in the MRMO system, include detecting the state of signal propagation, such as the effect of multipath interference or the like, change the symbol rate for high-rate radio communications, and reduce the amount of consumed electric power.

In the block diagrams shown in the above embodiments, radio communication devices having a transmitter and a receiver, respectively, face each other, for illustrative purposes. However, a radio communication device usually has both a transmitter and a receiver. In this case, the antennas of the transmitter and the receiver can be shared by a sharing unit or a switch. The transmission signal/reception signal processing circuits have a function to perform serial-to-parallel conversion (or vice versa) of data. This function may be provided outside of the transmission signal/reception signal processing circuits. If the data are parallel, then the parallel data itself may be handled. Though the error rate measuring unit has been described in each of the above embodiments, the error rate measuring unit may not be hardware-implemented, but may be software-implemented for detecting an error rate, a retransmission rate, or an index correlated to an error rate. The plural propagation detectors which have been described above, i.e., the level detector, the error rate measuring unit, and the function of outputting a channel matrix, are provided when necessary, and not all of them need to be provided. Although not specifically described, an increase in the transmission capacity due to spatial multiplexing according to normal MIMO technology, a spatial diversity effect due to time-space coding, and optimum electric power distribution between transmitters using information of independent spatial transmission paths are also applicable to the embodiments of the present invention. In all of the embodiments, three or four transmitters and three or four receivers have been described for illustrative purposes. However, insofar as a plurality of transmitters and a plurality of receivers are provided, the numbers of transmitters and receivers are not limited to any particular values.

The invention claimed is:

1. A radio communications device comprising:
a transmitter comprising:
   a plurality of transmission antennas for radiating radio waves based on transmission RF signals;
   a plurality of transmitting circuit means for supplying the transmission RF signals to said plurality of the transmission antennas, respectively, based on a plurality of transmission signals; and
   transmission signal processing means comprising modulating means, for modulating input transmission data to generate said plurality of the transmission signals by using said modulating means, and for outputting the modulated plurality of the transmission signals to said plurality of the transmitting circuit means;
a receiver comprising:
   a plurality of reception antennas for receiving the radio waves transmitted by the plurality of the transmission antennas and outputting reception RF signals based on the received radio waves;
   a plurality of receiving circuit means for outputting reception signals based on said reception RF signals output respectively by said plurality of the reception antennas; and
   reception signal processing means comprising demodulating means, for demodulating the reception signals output respectively from said plurality of the receiving circuit means by using said demodulating means to generate reception data;
propagation detecting means for detecting a propagating state of said radio waves received by said plurality of the reception antennas;
symbol rate setting means for selecting a symbol rate, to be used during modulation and demodulation, from a plurality of symbol rates based on the detected propagating state, and for setting the selected symbol rate in said modulating means and said demodulating means;
control means for instructing said symbol rate setting means to set a high symbol rate or a low symbol rate in said modulating means and said demodulating means based on the propagating state detected by said propagation detecting means, wherein said control means determines an intensity of multipath interference based on the propagating state of said received radio waves detected by said propagation detecting means, instructs said symbol rate setting means to set the high symbol rate in said modulating means and said demodulating means when it is determined that the intensity of the multipath interference is weak, and instructs said symbol rate setting means to set the low symbol rate in said modulating means and said demodulating means when it is determined that the intensity of the multipath interference is strong; and
means for lowering a multilevel modulation index used to modulate and demodulate the transmission data and the reception signals in said modulating means and said demodulating means, respectively, when said high symbol rate is set, and increasing the multilevel modulation index in said modulating means and said demodulating means, respectively, when said low symbol rate is set,
wherein said symbol rate setting means and said means for lowering and increasing the multilevel modulation index simultaneously and dynamically change the symbol rate and the multilevel modulation index, respectively, according to the intensity of the multipath interference.

2. A radio communications device comprising:
a transmitter comprising:
   a plurality of transmission antennas for radiating radio waves based on transmission RF signals;
   a plurality of transmitting circuit means for supplying the transmission RF signals to said plurality of the transmission antennas, respectively, based on a plurality of transmission signals; and
   transmission signal processing means comprising a plurality of modulating means having respective different modulating schemes, for modulating input transmission data to generate said plurality of the transmission signals a selected one of said plurality of the modulating means, and for outputting the transmission signals to said plurality of the transmitting circuit means;
a receiver comprising:
   a plurality of reception antennas for receiving the radio waves transmitted by the plurality of the transmission antennas and outputting reception RF signals based on the received radio waves;
   a plurality of receiving circuit means for outputting reception signals based on said reception RF signals output respectively by said plurality of the reception antennas; and
   reception signal processing means comprising a plurality of demodulating means having respective different demodulation schemes, for demodulating the reception signals output respectively by said plurality of the receiving circuit means by using a selected one of said plurality of the demodulating means to generate reception data;
propagation detecting means for detecting a propagating state of said received radio waves;
modulating means/demodulating means selecting means for selecting one of said modulating means and one of said demodulating means for modulating the input transmission data and for demodulating the reception signals, respectively, based on the detected propagating state;
control means for instructing said modulating means/demodulating means selecting means to select modulating means and demodulating means which have a high symbol rate or to select modulating means and demodulating means which have a low symbol rate based on the propagating state detected by said propagation detecting means, wherein said control means determines an intensity of multipath interference based on the propagating state of said received radio waves detected by said propagation detecting means, instructs said modulating means/demodulating means selecting means to select modulating means and demodulating means which have the high symbol rate when it is determined that the intensity of the multipath interference is weak, and instructs said modulating means/demodulating means selecting means to select modulating means and demodulating means which have the low symbol rate when it is determined that the intensity of the multipath interference is strong; and means for lowering a multilevel modulation index used to modulate and demodulate the transmission data and the reception signals in said selected modulating means and said selected demodulating means, respectively, when said high symbol rate is selected, and increasing the multilevel modulation index in said selected modulating means and said selected demodulating means, respectively, when said low symbol rate is selected, wherein said modulating means/demodulating means selecting means and said means for lowering and increasing the multilevel modulation index simultaneously and dynamically change the symbol rate and the multilevel modulation index, respectively, according to the intensity of the multipath interference.

3. The radio communications device according to claim 1, wherein said transmission signal processing means and said reception signal processing means reduce a number of said plurality of the transmitting circuit means to be used and the number of said plurality of the receiving circuit means to be used when said high symbol rate is set, and increase the number of said plurality of the transmitting circuit means to be used and the number of said plurality of the receiving circuit means to be used when said low symbol rate is set.

4. The radio communications device according to claim 2, wherein said transmission signal processing means and said reception signal processing means reduce a number of said plurality of the transmitting circuit means to be used and the number of said plurality of the receiving circuit means to be used when said high symbol rate is selected, and increase the number of said plurality of the transmitting circuit means to be used and the number of said plurality of the receiving circuit means to be used when said low symbol rate is selected.

5. The radio communications device according to claim 1 or 2, wherein said control means instructs said transmission signal processing means and said reception signal processing means to use one of said plurality of transmitting circuit means and one of said plurality of receiving circuit means, respectively, when it is determined that the intensity of the multipath interference is weak, and instructs said transmission signal processing means and said reception signal processing means to use said plurality of transmitting circuit means and said plurality of receiving circuit means, respectively, when it is determined that the intensity of the multipath interference is strong.

6. A radio communications device comprising:
a transmitter comprising:
  a plurality of transmission antennas for radiating radio waves based on transmission RF signals;
  a plurality of transmitting circuit means for supplying the transmission RF signals to said plurality of the transmission antennas, respectively, based on a plurality of transmission signals; and
  transmission signal processing means comprising modulating means, for modulating input transmission data to generate said plurality of the transmission signals by using said modulating means, and for outputting the modulated plurality of the transmission signals to said plurality of the transmitting circuit means;
a receiver comprising:
  a plurality of reception antennas for receiving the radio waves transmitted by the plurality of the transmission antennas and outputting reception RF signals based on the received radio waves;
  a plurality of receiving circuit means for outputting reception signals based on said reception RF signals output respectively by said plurality of the reception antennas; and
  reception signal processing means comprising demodulating means, for demodulating the reception signals output respectively from said plurality of the receiving circuit means by using said demodulating means to generate reception data;
propagation detecting means for detecting a propagating state of said radio waves received by said plurality of the reception antennas;
symbol rate setting means for selecting a symbol rate, to be used during modulation and demodulation, from a plurality of symbol rates based on the detected propagating state, and for setting the selected symbol rate in said modulating means and said demodulating means,
wherein said modulating means has modulation modes including a direct modulation mode for directly modulating said input transmission data into a transmission carrier and an indirect modulation mode for modulating said input transmission data into a transmission carrier after the input transmission data are processed, said demodulating means has demodulation modes including a direct demodulation mode for directly demodulating said reception signals to generate said reception data and an indirect demodulation mode for demodulating the reception signals and thereafter processing the demodulated reception signals to generate said reception data;
modulation/demodulation mode selecting means for selecting and setting said modulation modes and said demodulation modes, wherein said modulation/demodulation mode selecting means determines an intensity of multipath interference based on the propagating state of said received radio waves detected by said propagation detecting means, instructs said modulating means and said demodulating means to use said direct modulation mode and said direct demodulation mode, respectively, when it is determined that the intensity of the multipath interference is weak, and instructs said modulating means and said demodulating means to use said indirect modulation mode and said indirect demodulation mode, respectively, when it is determined that the intensity of the multipath interference is strong; and
means for lowering a multilevel modulation index used to modulate and demodulate the transmission data and the reception signals in said modulating means and said demodulating means, respectively, when said high symbol rate is set, and increasing the multilevel modulation index in said modulating means and said demodulating means, respectively, when said low symbol rate is set,
wherein said symbol rate setting means and said means for lowering and increasing the multilevel modulation index simultaneously and dynamically change the symbol rate and the multilevel modulation index, respectively, according to the intensity of the multipath interference.

7. The radio communications device according to claim 5, wherein said control means instructs said modulating means and said demodulating means to select any one of modulating and demodulating processes including ASK, BPSK, FSK, QPSK, and DQPSK for modulating and demodulating the transmission data and the reception signals, respectively, and to use one of said plurality of transmitting circuit means and one of said plurality of receiving circuit means, respectively, when it is determined that the intensity of the multipath interference is weak, and instructs said modulating means and said demodulating means to select either of modulating and demodulating processes including OFDM with multilevel PSK or multilevel QAM as a primary modulation for modulating and demodulating the transmission data and the reception signals, respectively, and to use said plurality of transmitting circuit means and said plurality of receiving circuit means, respectively, when it is determined that the intensity of the multipath interference is strong.

8. The radio communications device according to claim 3, further comprising:
    power supply control means for controlling power supplies of said plurality of transmitting circuit means and said plurality of receiving circuit means, respectively, to stop supplying electric power to the transmitting circuit means and the receiving circuit means which are not in use.

9. A radio transmitter comprising:
    a plurality of transmission antennas for radiating radio waves based on RF signals;
    a plurality of transmitting circuit means for supplying the RF signals to said plurality of the transmission antennas, respectively, based on a plurality of transmission signals;
    transmission signal processing means comprising modulating means, for modulating input transmission data to generate said plurality of the transmission signals by using said modulating means, and for outputting the plurality of the transmission signals to said plurality of the transmitting circuit means;
    symbol rate setting means for selecting a symbol rate, to be used by the modulating means to modulate the input transmission data, from a plurality of symbol rates based on a detected propagating state of said radio waves, and for setting the selected symbol rate in said modulating means;
    control means for instructing said symbol rate setting means to set a high symbol rate or a low symbol rate in said modulating means based on the detected propagating state, wherein said control means determines an intensity of multipath interference based on the propagating state of said radio waves, instructs said symbol rate setting means to set the high symbol rate in said modulating means when it is determined that the intensity of the multipath interference is weak, and instructs said symbol rate setting means to set the low symbol rate in said modulating means when it is determined that the intensity of the multipath interference is strong; and
    means for lowering a multilevel modulation index used to modulate the transmission data in said modulating means when said high symbol rate is set, and increasing the multilevel modulation index in said modulating means when said low symbol rate is set,
    wherein said symbol rate setting means and said means for lowering and increasing the multilevel modulation index simultaneously and dynamically change the symbol rate and the multilevel modulation index, respectively, according to the intensity of the multipath interference.

10. A radio receiver comprising:
    a plurality of reception antennas for receiving radio waves from a transmitter and outputting reception RF signals;
    a plurality of receiving circuit means for outputting reception signals based on said reception RF signals output respectively by said plurality of the reception antennas;
    reception signal processing means comprising demodulating means, for demodulating the reception signals output respectively by said plurality of the receiving circuit means by using said demodulating means to generate reception data;
    symbol rate setting means for selecting a symbol rate, to be used by said demodulating means to demodulate the reception signals, from a plurality of symbol rates based on a detected propagating state of said radio waves, and for setting the selected symbol rate in said demodulating means;
    control means for instructing said symbol rate setting means to set a high symbol rate or a low symbol rate in said demodulating means based on the detected propagating state, wherein said control means determines an intensity of multipath interference based on the propagating state of said radio waves, instructs said symbol rate setting means to set the high symbol rate in said demodulating means when it is determined that the intensity of the multipath interference is weak, and instructs said symbol rate setting means to set the low symbol rate in said demodulating means when it is determined that the intensity of the multipath interference is strong; and
    means for lowering a multilevel modulation index used to demodulate the reception signals in said demodulating means when said high symbol rate is set, and increasing the multilevel modulation index in said demodulating means when said low symbol rate is set,
    wherein said symbol rate setting means and said means for lowering and increasing the multilevel modulation index simultaneously and dynamically change the symbol rate and the multilevel modulation index, respectively, according to the intensity of the multipath interference.

11. A radio transmitter comprising:
    a plurality of transmission antennas for radiating radio waves based on RF signals;
    a plurality of transmitting circuit means for supplying the RF signals to said plurality of the transmission antennas, respectively, based on a plurality of transmission signals;
    transmission signal processing means comprising a plurality of modulating means having respective different modulating schemes, for modulating input transmission data to generate said plurality of the transmission signals by using a selected one of said plurality of the modulating means, and for outputting the transmission signals to said plurality of the transmitting circuit means;
    modulating means selecting means for selecting one of said modulating means to be used for modulating the input transmission data based on a detected propagating state of said radio waves; and
    control means for instructing said modulating means selecting means to select modulating means which have a high symbol rate or to select modulating means which have a low symbol rate based on the detected propagating state, wherein said control means determines an intensity of multipath interference based on the propagating state of said radio waves, instructs said modulating means selecting means to select modulating means which have the high symbol rate when it is determined that the intensity of the multipath interference is weak, and instructs said modulating means selecting means to select modulating means which have the low symbol rate when it is determined that the intensity of the multipath interference is strong; and
    means for lowering a multilevel modulation index used to modulate the transmission data in said selected modulating means when said high symbol rate is selected, and increasing the multilevel modulation index in said selected modulating means when said low symbol rate is selected, wherein said modulating means selecting means and said means for lowering and increasing the multilevel modulation index simultaneously and dynamically change the symbol rate and the multilevel modulation index, respectively, according to the intensity of the multipath interference.

12. A radio receiver comprising:

a plurality of reception antennas for receiving radio waves from a transmitter and outputting reception RF signals;

a plurality of receiving circuit means for outputting reception signals based on said reception RF signals output respectively by said plurality of the reception antennas;

reception signal processing means comprising a plurality of demodulating means having respective different demodulating schemes, for demodulating the reception signals output respectively by said plurality of the receiving circuit means by using a selected one of said plurality of the demodulating means to generate reception data;

demodulating means selecting means for selecting one of said demodulating means to be used for demodulating the reception signals based on a detected propagating state of said radio waves; and control means for instructing said demodulating means selecting means to select demodulating means which have a high symbol rate or to select demodulating means which have a low symbol rate based on the detected propagating state, wherein said control means determines an intensity of multipath interference based on the propagating state of said radio waves, instructs said demodulating means selecting means to select demodulating means which have the high symbol rate when it is determined that the intensity of the multipath interference is weak, and instructs said demodulating means selecting means to select demodulating means which have the low symbol rate when it is determined that the intensity of the multipath interference is strong; and means for lowering a multilevel modulation index used to demodulate the reception signals in said selected demodulating means when said high symbol rate is selected, and increasing the multilevel modulation index in said selected demodulating means when said low symbol rate is selected, wherein said demodulating means selecting means and said means for lowering and increasing the multilevel modulation index simultaneously and dynamically change the symbol rate and the multilevel modulation index, respectively, according to the intensity of the multipath interference.

13. A radio communications device comprising:

a transmitter comprising:
- a plurality of transmission antennas for radiating radio waves based on transmission RF signals;
- a plurality of transmitting circuits for supplying the transmission RF signals to said plurality of the transmission antennas, respectively, based on a plurality of transmission signals; and
- a transmission signal processing circuit comprising a modulator, for modulating input transmission data to generate said plurality of the transmission signals by using said modulator, and for outputting the modulated plurality of the transmission signals to said plurality of the transmitting circuits;

a receiver comprising:
- a plurality of reception antennas for receiving the radio waves transmitted by the plurality of the transmission antennas and outputting reception RF signals based on the received radio waves;
- a plurality of receiving circuits for outputting reception signals based on said reception RF signals output respectively by said plurality of the reception antennas; and
- a reception signal processing circuit comprising a demodulator, for demodulating the reception signals output respectively from said plurality of the receiving circuits by using said demodulator to generate reception data;

a propagation detecting circuit for detecting a propagating state of said radio waves received by said plurality of the reception antennas;

a symbol rate setting circuit for selecting a symbol rate, to be used during modulation and demodulation, from a plurality of symbol rates based on the detected propagating state, and for setting the selected symbol rate in said modulator and said demodulator;

a control circuit for instructing said symbol rate setting circuit to set a high symbol rate or a low symbol rate in said modulator and demodulator based on the propagating state detected by said propagation detecting circuit, wherein said control circuit determines an intensity of multipath interference based on the propagating, state of said received radio waves detected by said propagation detecting circuit, instructs said symbol rate setting circuit to set the high symbol rate in said modulator and said demodulator when it is determined that the intensity of the multipath interference is weak, and instructs said symbol rate setting circuit to set the low symbol rate in said in said modulator and said demodulator when it is determined that the intensity of the multipath interference is strong; and a multilevel modulation index adjustment circuit which lowers a multilevel modulation index used to modulate and demodulate the transmission data and the reception signals in said modulator and demodulator, respectively, when said high symbol rate is set, and which increases the multilevel modulation index in said modulator and demodulator, respectively, when said low symbol rate is set, wherein said symbol rate setting circuit and said multilevel modulation index adjustment circuit simultaneously and dynamically change the symbol rate and the multilevel modulation index, respectively, according to the intensity of the multipath interference.

14. A radio receiver comprising:

a plurality of reception antennas for receiving radio waves from a transmitter and outputting reception RF signals;

a plurality of receiving circuits for outputting reception signals based on said reception RF signals output respectively by said plurality of the reception antennas;

a reception signal processing circuit comprising a demodulator, for demodulating the reception signals output respectively by said plurality of the receiving circuits by using said demodulator to generate reception data;

a symbol rate setting circuit for selecting a symbol rate, to be used by said demodulator to demodulate the reception signals, from a plurality of symbol rates based on a detected propagating state of said radio waves, and for setting the selected symbol rate in said demodulator;

a control circuit for instructing said symbol rate setting circuit to set a high symbol rate or a low symbol rate in said demodulator based on the detected propagating state, wherein said control circuit determines an intensity of multipath interference based on the propagating state of said radio waves, instructs said symbol rate setting circuit to set the high symbol rate in said demodulator when it is determined that the intensity of the multipath interference is weak, and instructs said symbol rate setting means to set the low symbol rate in said demodulator when it is determined that the intensity of the multipath interference is strong; and a multilevel modulation index adjustment circuit which lowers the multilevel modulation index used to demodulate the reception signals in said demodulator when said high symbol rate is set, and which increases the multilevel modulation index in said demodulator when said low symbol rate is set, wherein said symbol rate setting circuit and said multilevel modulation index adjustment circuit simultaneously and dynamically change the symbol rate and the multilevel modulation index, respectively, according to the intensity of the multipath interference.

15. A radio communication device comprising:

a plurality of modulating means for modulating transmission data to generate a plurality of transmission signals;

a plurality of transmission means for supplying, based on said plurality of transmission signals, transmission RF signals to a plurality of transmission antennas, wherein said plurality of transmission antennas radiate radio waves based on the transmission RF signals;

a plurality of demodulating means for demodulating reception signals based on reception RF signals output from reception antennas that have received the radio waves from the plurality of the transmission antennas, to generate reception data, wherein the reception antennas output the reception RF signals based on the received radio waves;

propagation detecting means for detecting a propagating state of said received radio waves;

control means for selecting, based on the propagating state detected by said propagation detecting means, modulating means, among the plurality of the modulating means, and demodulating means, among the plurality of the demodulating means, which have a high symbol rate or for selecting, based on the propagating state detected by said propagation detecting means, modulating means, among the plurality of the modulating means, and demodulating means, among the plurality of the demodulating means, which have a low symbol rate, wherein a first symbol rate in said plurality of modulating means and a second symbol rate in said plurality of demodulating means are set based on an intensity of the multipath interference which is determined based on the detected propagating state of the radio waves, wherein said control means determines the intensity of the multipath interference based on the propagating state of said received radio waves detected by said propagation detecting means, said control means selects modulating means and demodulating means which have the high symbol rate when it is determined that the intensity of the multipath interference is weak, and said control means selects modulating means and demodulating means which have the low symbol rate when it is determined that the intensity of the multipath interference is strong; and means for lowering a multilevel modulation index used to modulate and demodulate the transmission data and the reception signals in said selected modulating means and said selected demodulating means, respectively, when said high symbol rate is selected, and increasing the multilevel modulation index in said selected modulating means and said selected demodulating means, respectively, when said low symbol rate is selected, wherein said control means and said means for lowering and increasing the multilevel modulation index simultaneously and dynamically change the symbol rate and the multilevel modulation index, respectively, according to the intensity of the multipath interference.

16. A radio communications device comprising:

a transmitter comprising:

a plurality of transmission antennas for radiating radio waves based on transmission RF signals;

a plurality of transmitting circuit means for supplying the transmission RF signals to said plurality of the transmission antennas, respectively, based on a plurality of transmission signals; and transmission signal processing means comprising a plurality of modulating means having respective different modulating schemes, for modulating input transmission data to generate said plurality of the transmission signals by using a selected one of said plurality of the modulating means, and for outputting the transmission signals to said plurality of the transmitting circuit means;

a receiver comprising:

a plurality of reception antennas for receiving the radio waves transmitted by the plurality of the transmission antennas and outputting reception RF signals based on the received radio waves;

a plurality of receiving circuit means for outputting reception signals based on said reception RF signals output respectively by said plurality of the reception antennas; and reception signal processing means comprising a plurality of demodulating means having respective different demodulation schemes, for demodulating the reception signals output respectively by said plurality of the receiving circuit means by using a selected one of said plurality of the demodulating means to generate reception data;

propagation detecting means for detecting a propagating state of said received radio waves;

modulating means/demodulating means selecting means for selecting, based on the detected propagating state, one of said modulating means and one of said demodulating means for modulating the input transmission data and for demodulating the reception signals, respectively, which selected modulating means and selected demodulating means have a high symbol rate or have a low symbol rate, wherein said selected modulating means has modulation modes including a direct modulation mode for directly modulating said input transmission data into a transmission carrier and an indirect modulation mode for modulating said input transmission data into a transmission carrier after the input transmission data are processed, said selected demodulating means has demodulation modes including a direct demodulation mode for directly demodulating said reception signals to generate said reception data and an indirect demodulation mode for demodulating the reception signals and thereafter processing the demodulated reception signals to generate said reception data;

modulation/demodulation mode selecting means for selecting and setting said modulation modes and said demodulation modes, wherein said modulation/demodulation mode selecting means determines an intensity of multipath interference based on the propagating state of said received radio waves detected by said propagation detecting means, instructs said selected modulating means and said selected demodulating means to use said direct modulation mode and said direct demodulation mode, respectively, when it is determined that the intensity of the multipath interference is weak, and instructs said selected modulating means and said selected demodulating means to use said indirect modulation mode and said indirect demodulation mode, respectively, when it is determined that the intensity of the multipath interference is strong; and means for lowering a multilevel modulation index used to modulate and demodulate the transmission data and the reception signals in said selected modulating means and said selected demodulating means, respectively, when said high symbol rate is set in said selected modulating means and said selected demodulating means, and increasing the multilevel modulation index in said selected modulating means and said selected demodulating means, respectively, when said low symbol rate is set in said selected modulating means and said selected demodulating means, wherein said modulating means/demodulating means selecting means and said means for lowering and increasing the multilevel modulation index simultaneously and dynamically change the symbol rate and the multilevel modulation index, respectively, according to the intensity of the multipath interference.

* * * * *